United States Patent
Jiang et al.

(10) Patent No.: US 10,425,182 B2
(45) Date of Patent: Sep. 24, 2019

(54) INTER-BAND DISTORTION AND INTERFERENCE MITIGATION WITHIN COMMUNICATION SYSTEMS

(71) Applicant: Futurewei Technologies, Inc., Plano, TX (US)

(72) Inventors: Hong Jiang, Kernersville, NC (US); Wael Al-Qaq, Oak Ridge, NC (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/720,437

(22) Filed: Sep. 29, 2017

(65) Prior Publication Data
US 2019/0103930 A1  Apr. 4, 2019

(51) Int. Cl.
| | |
|---|---|
| *H04B 7/0452* | (2017.01) |
| *H04B 10/2507* | (2013.01) |
| *H04B 7/0413* | (2017.01) |
| *H04B 10/69* | (2013.01) |
| *H04J 11/00* | (2006.01) |
| *H04L 27/00* | (2006.01) |
| *H04L 25/03* | (2006.01) |

(52) U.S. Cl.
CPC .......... *H04J 11/005* (2013.01); *H04B 7/0413* (2013.01); *H04B 7/0452* (2013.01); *H04B 10/2507* (2013.01); *H04B 10/697* (2013.01); *H04L 25/03057* (2013.01); *H04L 27/0002* (2013.01)

(58) Field of Classification Search
CPC combination set(s) only.
See application file for complete search history.

(56) References Cited

U.S. PATENT DOCUMENTS

| | | | |
|---|---|---|---|
| 6,606,484 B1 | 8/2003 | Faulkner | |
| 7,983,187 B2 * | 7/2011 | Wigren | H04W 52/343 370/252 |

(Continued)

FOREIGN PATENT DOCUMENTS

| | | |
|---|---|---|
| CN | 103166906 A | 6/2013 |
| JP | H07123016 A | 5/1995 |

OTHER PUBLICATIONS

International Searching Authority; International Search Report and Written Opinion; International Application No. PCT/CN2018/0108579; Jan. 3, 2019; 9 pgs.

*Primary Examiner* — Linda Wong
(74) *Attorney, Agent, or Firm* — James Anderson Harrison

(57) ABSTRACT

A wireless communication device includes one or more transmitter (TX)-receiver (RX) pairs, one or more RX distortion estimators, and a combiner. A first RX distortion estimator receives a first TX signal corresponding to a first TX of the first TX-RX pair and a second TX signal corresponding to a second TX of a second TX-RX pair. The first RX distortion estimator processes the first TX signal and the second TX signal based on a first base function set including at least one base function to generate a first distortion signal set including at least one distortion signal. Then, the first RX distortion estimator processes the first distortion signal set to generate a first RX correction signal. The wireless communication device's combiner generates a first distortion compensated RX signal by compensating for distortion in a first RX signal of the first TX-RX pair based on the first RX correction signal.

17 Claims, 11 Drawing Sheets

(56) References Cited

U.S. PATENT DOCUMENTS

| | | | |
|---|---|---|---|
| 9,083,416 B2* | 7/2015 | Bolinth | H04B 7/0871 |
| 2006/0008037 A1* | 1/2006 | Chang | H04L 1/20 |
| | | | 375/346 |
| 2009/0019150 A1* | 1/2009 | Li | H04B 7/086 |
| | | | 709/224 |
| 2010/0165860 A1* | 7/2010 | Wigren | H04W 52/343 |
| | | | 370/252 |
| 2010/0232537 A1* | 9/2010 | Park | H04B 7/0619 |
| | | | 375/267 |
| 2013/0156083 A1 | 6/2013 | Jechoux et al. | |
| 2013/0259113 A1 | 10/2013 | Kumar | |
| 2013/0343440 A1* | 12/2013 | Negus | H04B 1/38 |
| | | | 375/219 |
| 2014/0112423 A1 | 4/2014 | Li Puma et al. | |
| 2015/0065064 A1* | 3/2015 | Hwang | H04B 1/1036 |
| | | | 455/78 |
| 2017/0033813 A1* | 2/2017 | Jiang | H04B 17/21 |
| 2017/0054545 A1* | 2/2017 | Negus | H04L 5/1423 |
| 2017/0207862 A1* | 7/2017 | Aoki | H04B 15/00 |
| 2018/0351590 A1* | 12/2018 | Arditti Ilitzky | H04B 1/10 |
| 2019/0020384 A1* | 1/2019 | Kamiya | H04B 7/005 |

\* cited by examiner

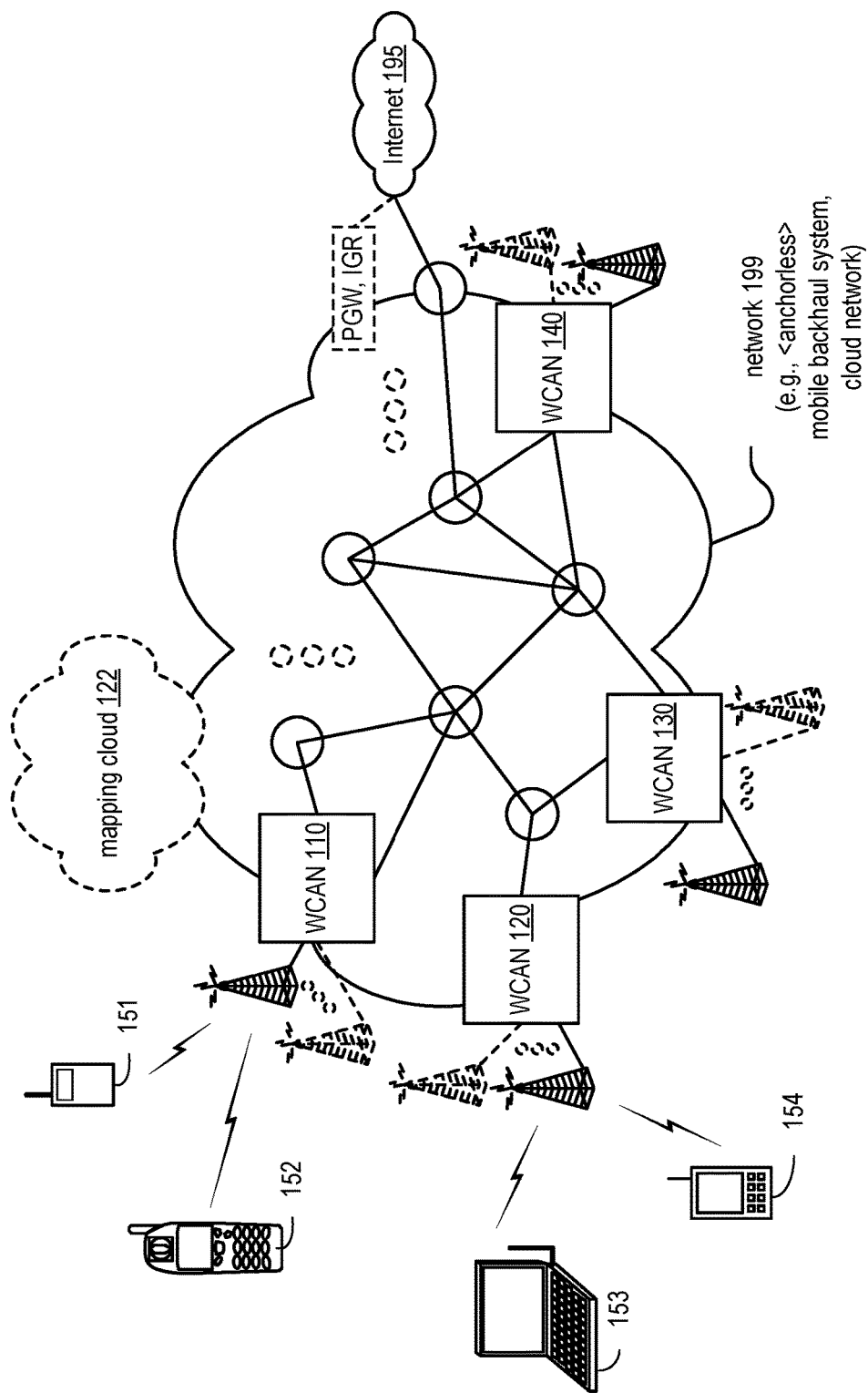

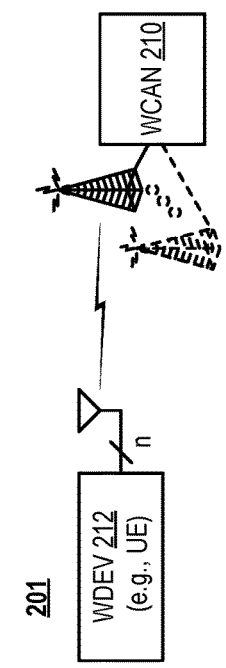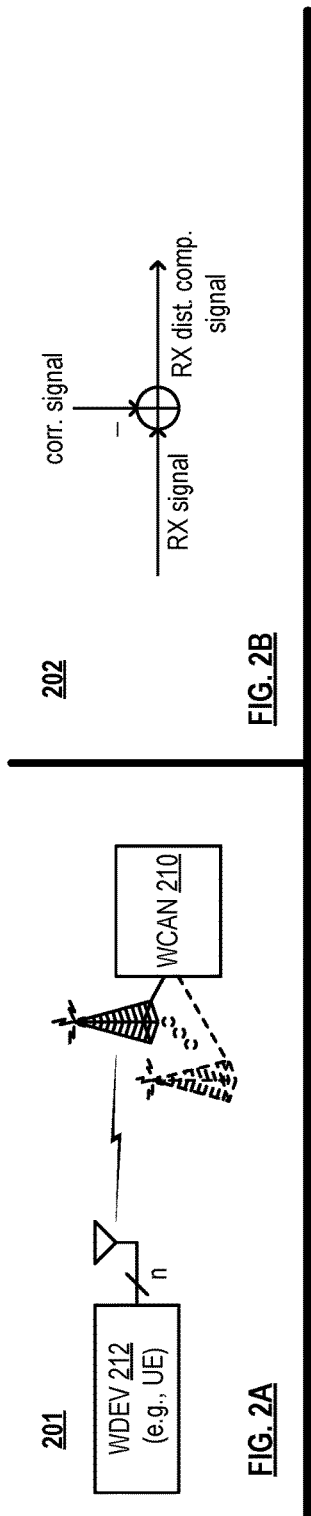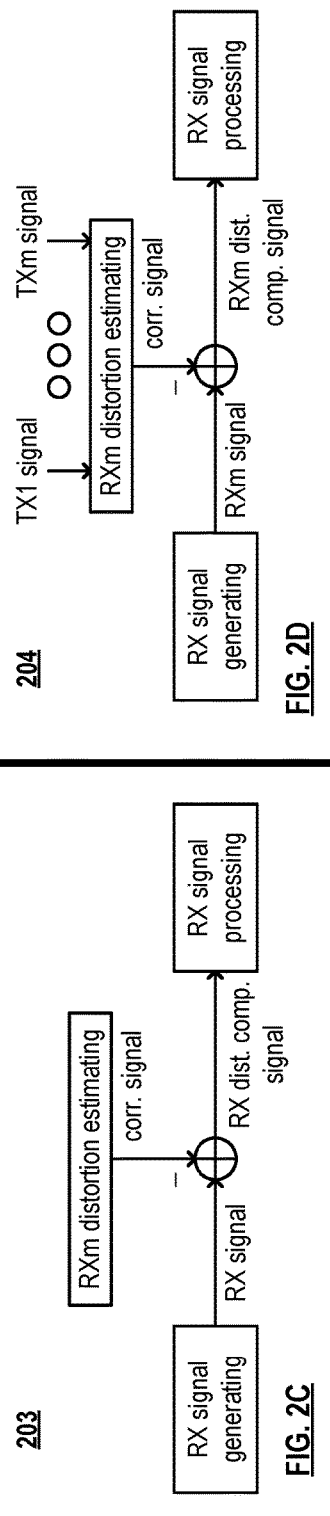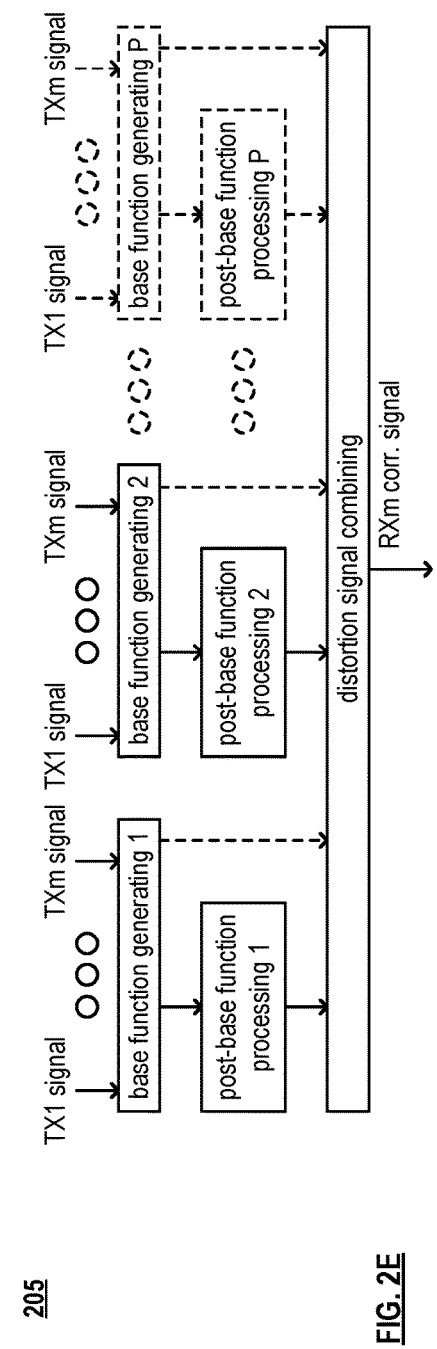

INTER-BAND DISTORTION AND INTERFERENCE MITIGATION WITHIN COMMUNICATION SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Technical Field

The present disclosure relates generally to communication systems; and, more particularly, to cancellation of inter-band interference within such communication systems including wireless communication systems.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

Certain communication devices suffer from interference, noise, ingress, distortion, etc. and other deleterious effect when operating within communication systems. Particularly in communication systems that may support communications in different respective communication channels at different respective frequencies, such deleterious effects may degrade overall performance for various communication devices therein. There exists in the prior art significant room for improvement in the manner by which communications are supported and made within such communication systems.

SUMMARY

It is an object of the present disclosure to provide methods and structures that enable a communication device, such as a wireless communication device, to perform distortion and interference mitigation. It is another object of the present disclosure to provide a digital correction method to remove possible transmitter-related distortions within the communication device. For example, within communication devices that operate using more than one band-pair and/or operate using more than one communication channel, various orders of inter-modulation products may be generated from the combination of transmitters signals (and/or conjugate of transmitter signals) and negatively affect receiver performance therein. Note that a receiver may alternatively be referred to as a receiving unit. It is another object of the present disclosure to identify a non-linearity mechanism within the communication device and to generate a digital signal that emulates the distortion generated within the communication device (e.g., within analog and/or radio frequency (RF) associated circuitry). It is another object of the present disclosure to perform distortion and interference mitigation by processing a received signal based on an estimated distortion signal (e.g., such as by subtracting the estimated distortion signal from the received signal).

According to one embodiment of the present disclosure, a wireless communication device is configured to communicate with a wireless communication access node (WCAN) device using radio frequency (RF) interface (I/F) circuitry that includes transmitter (TX)-receiver (RX) pairs. Note that a transmitter may alternatively be referred to as a transmitting unit, and a receiver may alternatively be referred to as a receiving unit. The wireless communication device is also configured to perform distortion estimation using RX distortion estimators that respectively correspond to the TX-RX pairs. Considering a first RX distortion estimator corresponding to a first TX-RX pair, the first RX distortion estimator is configured to receive a first TX signal corresponding to a first TX of the first TX-RX pair and a second TX signal corresponding to a second TX of a second TX-RX pair. The first RX distortion estimator is also configured to process the first TX signal and the second TX signal based on a first base function to generate a first distortion signal corresponding to a first RX of the first TX-RX pair and also to process the first TX signal and the second TX signal based on a second base function to generate a second distortion signal corresponding to a second RX of the second TX-RX pair. Then, the first RX distortion estimator is configured to process the first distortion signal and the second distortion signal to generate a first correction signal to compensate for distortion within a first RX signal.

In one example, a wireless communication device includes a plurality of transmitter (TX)-receiver (RX) pairs, one or more RX distortion estimators, and one or more combiners. When multiple RX distortion estimators are implemented, each one of the RX distortion estimators corresponds to a respective one of the plurality of TX-RX pairs. Considering a first RX distortion estimator corresponding to a first TX-RX pair, such a first RX distortion estimator is configured to receive a first TX signal corresponding to a first TX of the first TX-RX pair and a second TX signal corresponding to a second TX of a second TX-RX pair. Also, the first RX distortion estimator is configured to process the first TX signal and the second TX signal based on a first base function set including at least one base function to generate a first distortion signal set including at least one distortion signal. The first RX distortion estimator is also configured to process the first distortion signal set to generate a first RX correction signal. A first combiner of the wireless communication device is configured to generate a first distortion compensated RX signal by compensating for distortion in a first RX signal of the first TX-RX pair based on the first RX correction signal.

Also, in some alternative examples, note that such operations of a first RX distortion estimator within a wireless communication device also include to process the first TX signal, a conjugate of the first TX signal, the second TX signal, and a conjugate of the second TX signal based on the first base function set to generate the first distortion signal set. In certain other alternative examples of a first RX distortion estimator within a wireless communication device, the first RX distortion estimator is also configured to process the first TX signal and the second TX signal based on a frequency shift, a delay, and/or a low pass filter (LPF) to generate the first distortion signal set.

In some examples, a first RX distortion estimator is also configured to process the first TX signal and the second TX signal based on an environmental operational parameter, a local operational parameter corresponding to the wireless communication device, and/or a remote operational parameter corresponding to a wireless device configured to communicate with the wireless communication device.

Certain implementations of a wireless communication device implement such a first RX distortion estimator within a digital baseband circuitry that includes a first digital TX-RX processing path. Such a first digital TX-RX processing path includes a first digital front end (DFE) configured to process the first TX signal to generate a first TX DFE signal, and a first digital to analog converter (DAC) configured to process the first TX DFE signal to generate a first analog TX signal and to provide the first analog TX signal to the first TX of the first TX-RX pair. The first digital TX-RX processing path also includes a first analog to digital converter (ADC) circuitry configured to process a first analog RX signal received from the first RX of the first TX-RX pair to generate a first digital RX signal, and a second DFE configured to process the first digital RX signal to generate a first RX DFE signal.

In addition, within an implementation of a wireless communication device that includes two (or more) RX distortion estimators, a second RX distortion estimator corresponding to the second TX-RX pair is configured to receive the first TX signal corresponding to the first TX of the first TX-RX pair and the second TX signal corresponding to the second TX of the second TX-RX pair. The second RX distortion estimator is also configured to process the first TX signal and the second TX signal based on a second base function set including at least one base function to generate a second distortion signal set including at least one distortion signal and to process the second distortion signal set to generate a second RX correction signal. A second combiner of the wireless communication device is also configured to generate a second distortion compensated RX signal by compensating for distortion in a second RX signal of the second TX-RX pair based on the second RX correction signal.

Within certain alternative examples, a wireless communication device is also implemented such that the first TX-RX pair configured to communicate via at least one wireless communication channel with at least one wireless communication access node (WCAN) device based on a first band pair of the wireless communication channel, and the second TX-RX pair configured to communicate via the at least one wireless communication channel with the at least one WCAN device based on a second band pair of the wireless communication channel.

Also, in some examples, the first base function includes a first predetermined product term based on the first TX signal and the second TX signal, and the second base function includes a second predetermined product term based on the first TX signal and the second TX signal.

In a method example of implementation and operation, a method for execution by a wireless communication device includes receiving, by the wireless communication device, a first TX signal corresponding to a first TX of a first transmitter (TX)-receiver (RX) pair and a second TX signal corresponding to a second TX of a second TX-RX pair. The method also includes processing, by the wireless communication device, the first TX signal and the second TX signal based on a first base function set including at least one base function to generate a first distortion signal set including at least one distortion signal. The method also involves processing, by the wireless communication device, the first distortion signal set to generate a first RX correction signal. The method also operates by generating, by the wireless communication device, a first distortion compensated RX signal by compensating for distortion in a first RX signal of the first TX-RX pair based on the first RX correction signal.

In another example of operation and implementation, a wireless communication device is implemented to include a plurality of transmitter (TX)-receiver (RX) pairs, a non-transitory memory storage comprising instructions, and one or more processors in communication with the plurality of TX-RX pairs and to the memory. The one or more processors is configured to execute the instructions to receive a first TX signal corresponding to a first TX of a first TX-RX pair and a second TX signal corresponding to a second TX of a second TX-RX pair. The one or more processors is also configured to execute the instructions to process the first TX signal and the second TX signal based on a first base function set including at least one base function to generate a first distortion signal set including at least one distortion signal. Also, the one or more processors is also configured to execute the instructions to process the first distortion signal set to generate a first RX correction signal. The one or more processors is also configured to execute the instructions to generate a first distortion compensated RX signal by compensating for distortion in a first RX signal of the first TX-RX pair based on the first RX correction signal.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 is a diagram illustrating an embodiment of a communication system that is configured to service wireless communication devices.

FIG. 2A is a diagram illustrating an embodiment of at least a portion of a communication system that is configured to service one or more wireless communication devices.

FIG. 2B is a diagram illustrating an example of distortion mitigation signal processing using a correction signal.

FIG. 2C is a diagram illustrating another example of distortion mitigation signal processing including generating a correction signal by estimating distortion.

FIG. 2D is a diagram illustrating another example of distortion mitigation signal processing including generating a correction signal by estimating distortion based on a number of transmit signals.

FIG. 2E is a diagram illustrating another example of distortion mitigation signal processing including generating a correction signal based on multiple distortion signals that are based on multiple base functions respectively processing a number of transmit signals.

DETAILED DESCRIPTION

Figure 3:
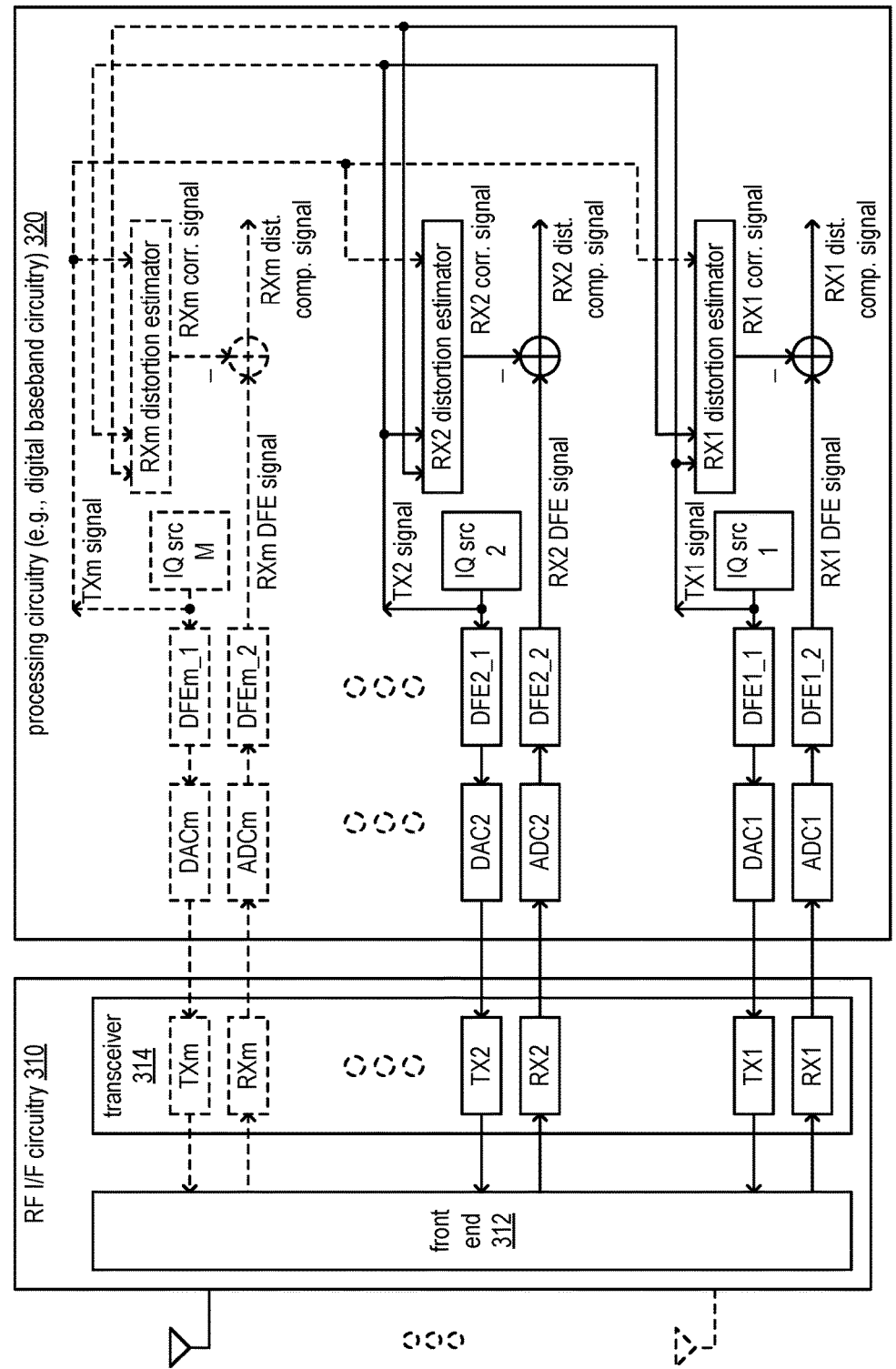
FIG. 3 is a diagram illustrating an embodiment of a wireless communication device that is configured to perform distortion mitigation signal processing.

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

FIG. 1 is a diagram illustrating an embodiment 100 of a communication system that is configured to service wireless communication devices. The communication system of this diagram includes wireless communication access node (WCAN) devices 110, 120, 130, and 140, wireless communication devices (e.g., shown such as using abbreviation WDEVs, or using abbreviation WDEV for a wireless communication device in certain of the diagrams) 151, 152, 153, and 154 (e.g., wireless stations (STAs), User Equipments (UEs), mobile wireless communication devices, stationary/fixed location wireless communication devices, etc.), and a network 199. Note that one or more antenna(s), remote radio heads (RRHs), transmitter/receiver (TX/RX) points, etc. may be associated with such WCAN devices (e.g., shown as towers connected to and/or coupled to the WCAN devices in the diagram).

In some examples, the network 199 may be implemented based on a mobile backhaul communication system within a communication system that provides mobile communication services to the wireless communication devices 151-154. In other examples, the network 199 is implemented based on an anchorless mobile backhaul communication system within a communication system that provides mobile communication services to the wireless communication devices 151-154. Note that an anchorless mobile backhaul communication system does not include dedicated components such as a service gateway (SGW) to effectuate communications for the wireless communication devices 151-154. Instead, in an anchorless mobile backhaul communication system, communications may be effectuated without using the general packet radio service (GPRS) tunneling protocol (GTP) as is used in anchor-based communication systems. In general, regardless of the particular implementation of the network 199, the network 199 includes at least one WCAN device that provides mobile communication services to at least one of the wireless communication devices 151-154.

The wireless communication devices 151-154 may be laptop computers, or tablets, personal digital assistants, personal computers, cellular telephones, smart phones, and/or any other wireless communication devices configured to communicate wirelessly with one or more of the WCAN devices 110-140. Other examples of such wireless communication devices 151-154 could also or alternatively include other types of devices that include wireless communication capability. Details of various embodiments of such WCAN devices are described in greater detail with reference to FIG. 8A and FIG. 8B among other diagrams. Details of various embodiments of such wireless communication devices are described in greater detail with reference to FIG. 9A and FIG. 9B among other diagrams.

The WCAN devices 110-140 are operably coupled to various devices (e.g., network hardware) within the network 199. Examples of such devices (e.g., network hardware) include any one or more of WCAN device, router, switch, bridge, modem, system controller, server, data center (e.g., including containers or virtual machines therein such as in a Cloud Radio Access Network (CRAN)), storage device (e.g., optionally including cloud storage device(s)), route locator (RLOC), etc. (e.g., certain of the devices within the mobile backhaul system shown as circles within the diagram).

In some implementations, a WCAN device of the WCAN devices 110-140 has associated one or more components (e.g., one or more of antenna(s), antenna array(s), etc.) to communicate wirelessly with the wireless communication devices in its area or proximity. In some examples, such components are co-located with the WCAN device (e.g., at the same location, or within close proximity to one another such as within a certain distance such as less than or equal to X meters, where X may be 1, 5, 10, 100, or some other positive number used to specify co-location or close proximity). Note that more than one of such components may be employed in various embodiments and for a WCAN device. A WCAN device may be implemented as a base station, a distributed base station, an Evolved Node B (eNodeB), a Home Evolved Node B (Home eNodeB), or a 5G Evolved Node B (gNodeB), etc.

In other implementations, a WCAN device of the WCAN devices 110-140 has associated one or more remotely-located components (e.g., one or more of remotely-located antenna(s), remotely-located antenna array(s), transmit/receive (TX/RX) points, remote radio head(s) (RRH(s)), base station(s), distributed base station(s), eNodeB(s), Home eNodeB(s), or gNodeB(s), etc.) to communicate wirelessly with certain of the wireless communication devices. In some examples, such remotely-located components are located remotely with the respective WCAN device (e.g., at a different location, or beyond a close proximity to the respective WCAN device such as at least a certain distance away from the WCAN device such as more than or equal to Y meters, where Y may be 10, 100, 500, 1 k, or some other positive number used to specify non-co-location or non-close proximity, and where there may be relationship between X above and Y such that within X meters specifies co-location or non-close proximity, and beyond Y meters specifies non-co-location or non-close proximity). The WCAN device facilitates the communication to/from the certain of the wireless communication devices via its respective one or more remotely-located components. In some examples, the WCAN device coordinates and manages a set of transmit/receive (TX/RX) points that each respectively support communications for different, respective, and unique cells (e.g., different coverage regions) each having different, respective, and unique cell IDs to support wireless communications in those cells. In addition, in certain implementations, the WCAN device coordinates and manages the set of transmit/receive (TX/RX) points in a manner such that different respective transmit/receive (TX/RX) points use a common cell ID (e.g., in a mobile communication system in which a UE may communicate at the same time or simultaneously with more than one of the transmit/receive (TX/RX) points that share a common cell ID, such may be implemented in accordance with a hypercell configuration in which a UE connects with a logical access node that is composed of multiple eNodeBs, transmit/receive (TX/RX) points, etc.).

Regardless of the specific implementation of such a WCAN device, in general, the WCAN device is operative to provide communications wirelessly with one or more of the wireless communication devices 151-154 as well as with the network 199. Typically, the wireless communication devices 151-154 registers with a particular one of the WCAN devices 110-140 to receive services from the communication system (e.g., Internet access via the Internet 195, voice calling communications, media such as audio and/or video communications, data communications, etc.). In addition, in an optional embodiment when the network 199 is implemented as part an anchorless implementation, a mapping cloud 122 may be implemented to include the current topology and mapping of the respective adaptive and configurable devices within the network 199.

Any of the various wireless communication devices 151-154 and WCAN devices 110-140 may include appropriate circuitry, functional blocks, etc. that may include processing circuitry, a communication interface, and/or memory to support communications with any other of the wireless communication devices 151-154 and WCAN devices 110-140. In an example of operation, processing circuitry and/or a communication interface implemented within one of the devices (e.g., any one of the wireless communication devices 151-154 and WCAN devices 110-140) is/are configured to process at least one signal received from and/or to generate at least one signal to be transmitted to another one of the devices (e.g., any other one of the wireless communication devices 151-154 and WCAN devices 110-140).

In an example of operation and implementation, WCAN device 120 supports communications with wireless communication devices 153, 154. The WCAN device 120 includes various components that, when appropriately configured, operate to effectuate certain operations and functions. Examples of such components within the WCAN device 120 may be found with reference to FIG. 8A and FIG. 8B (e.g., a WCAN device may include radio frequency (RF) circuitry, RF interface (I/F) circuitry, network communication circuitry, memory, and/or processing circuitry).

For example, the WCAN device 120 is configured to communicate with at least one wireless communication device (e.g., one or both of wireless communication devices 153, 154) using RF interface (I/F) circuitry. Note that the RF I/F circuitry may itself include RF circuitry that is configured to support RF communications with one or more UEs (e.g., over the air) and/or alternatively include interface circuitry configured to communicate via one or more intervening components to an end component/device that includes RF circuitry that is configured to support RF communications with one or more UEs (e.g., over the air). For example, as described above, such a WCAN device 120 may be implemented in a variety of ways. For example, the WCAN device may itself include one or more components (e.g., one or more of antenna(s), antenna array(s), etc.) that are co-located with respect to the WCAN device 120 to effectuate wireless communications directly with one or more UEs and/or may communicate via one or more other components (e.g., one or more of remotely-located antenna(s), remotely-located antenna array(s), transmit/receive (TX/RX) points, remote radio head(s) (RRH(s)), base station(s), distributed base station(s), eNodeB(s), Home eNodeB(s), or gNodeB(s), etc.) that are remotely-located with respect to the WCAN device 120 to effectuate wireless communications indirectly with one or more UEs. In one implementation, such RF interface (I/F) circuitry includes RF circuitry that is configured to support RF communications with one or more UEs (e.g., over the air); in this implementation, the RF interface (I/F) circuitry communicates directly with one or more UEs using RF circuitry implemented therein. In another one implementation, such RF interface (I/F) circuitry communicates with one or more other components that couple to and/or connect to an end component/device that includes RF circuitry that is configured to support RF communications with one or more UEs (e.g., over the air); in this implementation, the RF interface (I/F) circuitry communicates indirectly with the with one or more UEs via the one or more intervening components/devices.

Also, the WCAN device is configured to communicate with the network 199, which may be implemented as an anchorless mobile backhaul communication system in some examples, using network communication circuitry. In some examples, the WCAN device 120 includes processing circuitry that is coupled to the RF interface circuitry, the network communication circuitry, and the memory. The processing circuitry of the WCAN device 120, when executing operational instructions stored in the memory, is configured to perform various operations and functions.

In an example of operation and implementation, wireless communication device 151 is configured to support communications with WCAN device 110. For example, the wireless communication device 151 includes more than one transmitter (TX)-receiver (RX) pairs and supports communications with WCAN device 110 using more than one band pair (e.g., such as a first TX-RX pair operates based on a first band pair, and a second TX-RX pair operates based on a second band pair). In some examples, the wireless communication device 151 is configured to support communications simultaneously, in parallel, and/or at or during the same time, etc. using both a first TX-RX pair operates based on a first band pair and also using a second TX-RX pair operates based on a second band pair. In other examples, such wireless communication device 151 is configured to support communications with partial overlap such that a portion of the communications associated with the first TX-RX pair that operates based on that first band pair are made simultaneously, in parallel, and/or at or during the same time, etc. with another portion of the communications associated with the second TX-RX pair that operates based on that second band pair.

For example, the wireless communication device 151 includes radio frequency (RF) interface (I/F) circuitry that includes transmitter (TX)-receiver (RX) pairs and is configured to communicate with WCAN device 110 using those TX-RX pairs. In addition, the wireless communication device 151 also includes one or more RX distortion estimators such that each of the one or more RX distortion estimators corresponds to a respective one of the TX-RX pairs (e.g., a first RX distortion estimator corresponds to a first TX-RX pair, and a second RX distortion estimator corresponds to a first TX-RX pair).

Considering a first RX distortion estimator in the wireless communication device 151, the first RX distortion estimator is configured to receive a first TX signal corresponding to a first TX of the first TX-RX pair and a second TX signal corresponding to a second TX of a second TX-RX pair. Also, the first RX distortion estimator is configured to process the first TX signal and the second TX signal based on a first base function set including at least one base function to generate a first distortion signal set including at least one distortion signal. The first RX distortion estimator is also configured to process the first distortion signal set to generate a first RX correction signal. A first combiner of the wireless communication device is also configured to generate a first distortion compensated RX signal by compensating for distortion in a first RX signal of the first TX-RX pair based on the first RX correction signal.

Considering a first RX distortion estimator in another example, the first RX distortion estimator among the one or more RX distortion estimators, a first RX distortion estimator is configured to receive a first TX signal corresponding to a first TX of the first TX-RX pair and a second TX signal corresponding to a second TX of a second TX-RX pair. The first RX distortion estimator is also configured to process the first TX signal and the second TX signal based on a first base function to generate a first distortion signal and/or a second base function to generate a second distortion signal. In some examples and from certain perspectives, the first base function is associated with first TX inter-modulation interference, and the second base function is associated with second TX inter-modulation interference. The first RX distortion estimator is also configured to process the first distortion signal and/or the second distortion signal to generate a first RX correction signal. Then, the first RX distortion estimator is configured to compensate for distortion within a first RX signal based on the first RX correction signal to generate a first distortion compensated RX signal.

Optionally, note that a wireless communication device such as wireless communication device 151 or a wireless communication device in any of the various examples, embodiments, etc. described herein may be viewed as being a User Equipment (UE). Examples of such UEs may include laptop computers, or tablets, personal digital assistants, personal computers, cellular telephones, smart phones, and/or any other wireless communication devices or their equivalents as described herein. Also, optionally, note that a wireless communication access node (WCAN) device that is operative to support communications with such a wireless communication device in any of the various examples, embodiments, etc. described herein may be implemented as any one or more of a base station, a distributed base station, an Evolved Node B (eNodeB), a Home Evolved Node B (Home eNodeB), and/or a 5G Evolved Node B (gNodeB).

FIG. 2A is a diagram illustrating an embodiment 201 of at least a portion of a communication system that is configured to service one or more wireless communication devices. This at least a portion of a communication system may be implemented in any of variety of communication systems implemented to service and support communications with one or more wireless communication devices. For example, the WCAN device 210 may be implemented within any of a variety of types of communication systems including a network, a mobile backhaul communication system, an anchorless mobile backhaul communication system, a cloud network, and/or any other communication system that systems implemented to service and support communications with one or more wireless communication devices.

In an example of operation and implementation, the WCAN device 210 supports communications with wireless communication device 212 (e.g., shown as wireless communication device in the diagram, which may be a User Equipment (UE)). The wireless communication device 212 include one or more antenna (e.g., n antenna, where n is a positive integer greater than or equal to 1).

The wireless communication device 212 includes radio frequency (RF) interface (I/F) circuitry that is configured to support communications with the WCAN device 210. The RF I/F circuitry includes transmitter (TX)-receiver (RX) pairs and is configured to communicate with the WCAN device 210. The wireless communication device 212 also includes one or more RX distortion estimators as described herein.

In general, note that such appropriate circuitry, functional blocks, etc. as described herein may be included within any of a variety of types of communication devices including not only wireless communication devices, but in general any of a variety of types of communication device operative within any of a variety of types of communication systems including satellite communication devices, wireless communication devices, wired communication devices, fiber-optic communication devices, mobile communication devices, and/or other types of communication devices operative within a satellite communication system, a wireless communication system, a wired communication system, a fiber-optic communication system, a mobile communication system, and/or other types of communication systems.

For example, note that a first communication device may be implemented to include communication interface circuitry that is configured to support communications with a second communication device via one or more communication channels may include TX-RX pairs and RX distortion estimators that are operative to perform operations as described herein.

Such functionality, processing, means, etc. as described herein and within many of the following diagrams may be implemented in any of a variety of ways including via one or more application specific integrated circuits (ASICs), one or more integrated circuits, and/or one or more processing circuitries, etc. Alternatively, such functionality may be implemented using one or more "processing modules," "processing circuits," "processors," "judging units," "determining units," "executing units," and/or "processing units" or their equivalents as described herein. In other implementations, a digital signal processor (DSP) is configured to perform such functionality, processing, means, etc. as described herein. In addition, with respect to the various parameters, values, coefficients, etc. to be used in the functionality, processing, means, etc. as described herein may be determined in a variety of ways and/or updated, adapted, modified, etc. in a variety of ways. For example, original, start-up, default, etc. values of such parameters, values, coefficients, etc. to be used in accordance with such receiver (RX) distortion estimator processing as described herein may be determined based on a factory calibration phase, process, etc. Then, after operation of such a communication device that performs the functionality, processing, means, etc. as described herein is operative within one or more communication systems, those such parameters, values, coefficients, etc. may be updated, adapted, modified, etc. based on any number of considerations such as environmental conditions, operational history, processing resource history, component drift, and/or any other one or more considerations. During a factory calibration phase, process, etc. and/or during an update, adaptation, modification, etc. of the parameters, values, coefficients, etc. may be determined in a variety of ways including using least mean square (LMS) processing, normalized least mean square (NLMS) processing, recursive least square (RLS) processing, cascaded LMS-RLS processing, mean squared error (MSE) processing, mean squares deviation (MSD) processing, and/or any other processing by which estimation of parameters, values, coefficients, etc. may be performed.

Also, in an example embodiment, a communication device is operative to perform distortion and interference mitigation. Such a communication device includes a radio frequency (RF) interface (I/F) element that includes transmitter (TX)-receiver (RX) pair elements. In some examples, such a RF I/F element that includes TX-RX pair elements is configured to communicate with one or more WCAN devices. The communication device also includes one or more RX distortion estimator elements. A respective RX distortion estimator element corresponds to a respective one of the TX-RX pair elements. Considering a first RX distortion estimator element corresponding to a first TX-RX pair element, the first RX distortion estimator element includes a receiving element that is configured to receive a first TX signal corresponding to a first TX of the first TX-RX pair and a second TX signal corresponding to a second TX of a second TX-RX pair. The first RX distortion estimator element is also configured to process the first TX signal and the second TX signal based on a first base function (e.g., that may be associated with first TX inter-modulation interference) to generate a first distortion signal and/or a second base function (e.g., that may be associated with second TX inter-modulation interference) to generate a second distortion signal.

The first RX distortion estimator element is also configured to process the first distortion signal and/or the second distortion signal to generate a first RX correction signal. The first RX distortion estimator element is also configured to compensate for distortion within a first RX signal based on the first RX correction signal to generate a first distortion compensated RX signal.

FIG. 2B is a diagram illustrating an example 202 of distortion mitigation signal processing using a correction signal. This implementation includes processing that involves combination of a correction signal with a receiver (RX) signal to generate a RX distortion compensated signal.

FIG. 2C is a diagram illustrating another example 203 of distortion mitigation signal processing including generating a correction signal by estimating distortion. This implementation includes receiver distortion estimating. Such an implementation may be viewed as being performed among each of a number of receiver distortion estimating (e.g., from a $1^{st}$ receiver distortion estimating to an m-th receiver distortion estimating), and this diagram shows distortion estimating based on an m-th distortion estimating, RXm distortion estimating. In addition, this implementation includes receiver (RX) signal generating. Such RX signal generating may involve a variety of other operations including demodulation, decoding, etc. including those that may be performed by one or more analog front end (AFE) and/or physical layer (PHY) components such as may be implemented within a communication device. In this implementation, such processing involves combination of a correction signal that has been generated by RXm distortion estimating and a receiver (RX) signal that has been generated by RX signal generating to generate a RX distortion compensated signal that may be further processed by RX signal processing.

FIG. 2D is a diagram illustrating another example 204 of distortion mitigation signal processing including generating a correction signal by estimating distortion based on a number of transmit signals. This implementation includes receiver distortion estimating based on a number of transmitter (TX) signals (e.g., TX1 signal through TXm signal). Such an implementation may be viewed as being performed among each of a number of receiver distortion estimating (e.g., from a $1^{st}$ receiver distortion estimating to an m-th receiver distortion estimating), and this diagram shows distortion estimating based on an m-th distortion estimating, RXm distortion estimating, that is specifically based on the transmitter (TX) signals (e.g., TX1 signal through TXm signal). In this implementation, such processing involves combination of a correction signal that has been generated by RXm distortion estimating that is based on the transmitter (TX) signals (e.g., TX1 signal through TXm signal) and a receiver (RX) signal that has been generated by RX signal generating to generate a RX distortion compensated signal that may be further processed by RX signal processing.

FIG. 2E is a diagram illustrating another example 205 of distortion mitigation signal processing including generating a correction signal based on at least one of multiple distortion signals that are based on multiple base functions respectively processing a number of transmit signals. Examples of such base functions also are provided below. In general, a base function is associated with transmitter (TX) inter-modulation interference that is based on two or more transmitter (TX) signals. For example, various base functions may be viewed as terms within a product of terms function, $\Pi_{i=1}^{m} TX_i^{l_i} * TX_i^{*k_i}$, where $TX_i^{l_i}$ corresponds to various TX signals (e.g., TX1 signal, TX2 signal, etc. of various orders such as $TX_1^0$, $TX_1^1$, $TX_1^2$, etc. and $TX_2^0$, $TX_2^1$, $TX_2^2$, etc.) and where $TX_i^{*k_i}$ corresponds to conjugates of the various TX signals (e.g., conjugate of TX1 signal, conjugate of TX2 signal, etc. of various orders such as $TX_1^{*0}$, $TX_1^{*1}$, $TX_1^{*2}$, etc. and $TX_2^{*0}$, $TX_2^{*1}$, $TX_2^{*2}$, etc.). In some examples, note that as few as one base function is used to perform distortion mitigation. For example, when considering an implementation that operates using TX1 signal and TX2 signal, any number (or all) of the respective base functions may be considered, yet only the one or more base functions corresponding to one or more base inter-modulation interference terms based on the TX1 signal and the TX2 signal that will negatively affect the operation of a wireless communication device are the base function(s) are actually used.

In a specific example of a wireless communication device that operates using TX1 signal and the TX2 signal, when only inter-modulation interference associated with the TX1 signal and a $2^{nd}$ order conjugate of the TX2 signal negatively affect the operation of a wireless communication device, then only the base function $TX_1^1 * TX_2^{*2}$, is used. In another specific example of a wireless communication device that operates using TX1 signal and the TX2 signal, when only inter-modulation interference associated with a $2^{nd}$ order of the TX1 signal and a $3^{rd}$ order conjugate of the TX2 signal negatively as well as a $1^{st}$ order of the TX1 signal and a $2^{nd}$ order conjugate of the TX2 signal negatively affect the operation of a wireless communication device, then both the base function $TX_1^2*TX_2^{*3}$ as well as the base function $TX_1^{1}*TX_2^{*2}$ are used. In some examples, determination of which base functions are needed in a given wireless communication device's implementation may be made 'a priori', offline, or beforehand. When a wireless communication device is being manufactured, and specifics regarding the TX1 signal and the TX2 signal (or more TX signals) are known, then identification of any possible inter-modulation interference that will negatively affect the operation of the wireless communication device may be made, and the associated base functions may be identified.

In other examples such as those including a wireless communication device that is adaptive and configurable to switch operation, for example, between using TX1 signal and the TX2 signal (or more TX signals) and TX3 signal and the TX4 signal (or more TX signals), then identification of any possible inter-modulation interference that will negatively affect the operation of the wireless communication device may be made. For example, any inter-modulation interference based on the TX1 signal and the TX2 signal (or more TX signals) may be used to identify first one or more base functions, and any inter-modulation interference based on the TX3 signal and the TX4 signal (or more TX signals) may be used to identify second one or more base functions. Then, in operation, depending of which particular TX signals are being used (e.g., TX1 signal and the TX2 signal (or more TX signals) or the TX3 signal and the TX4 signal (or more TX signals)) by the wireless communication device in operation, then the appropriate base function(s) are appropriately selected and used to compensate for possible distortion based on those particular TX signals.

This implementation includes base function generating based on a number of transmitter (TX) signals (e.g., TX1 signal through TXm signal). For example, the base function may be based on a TX distortion term that corresponds to distortion near a receiver's path (e.g., corresponding to a RX's path within the communication device). Such a TX distortion term may be calculated based on a product of terms function that operates on the TX signals from the total number of paths within the communication device). In addition, frequency shifting processing may also be performed when considering that the center frequency of a TX's distortion term may be different than a RX's path operating center frequency. Moreover, scale factor processing corresponding to the TX distortion signal level at a RX path's may be used to generate a distortion signal for that RX's path.

There are many possible situations in which distortion may be generated within communication systems. One such situation corresponds to cellular communication systems. For example, considering the current 3GPP Long Term Evolution (LTE) standard, communications are supported using Uplink (UL) inter-band carrier aggregation (CA) that operates to gain bandwidth in order to improve data throughput. However, within such communication systems that operates based on CA, the distortion generated by the transmitter signals of the respective band pairs (e.g., such as a first TX-RX pair operating based on a first band pair, and a second TX-RX pair operating based on a second band pair, and so on) can unfortunately fall into a wireless communication device's own RX path and cause any of a number of negative and/or deleterious effects including de-sense. For example, when there is a significant degree of distortion within the RX path, a significant amount of de-sense may be needed or allowed for operation, but this will typically also result in significant degradation of performance.

In addition, due to the large number of possible LTE UL inter-band CA band combinations (e.g., such as based on operation using multiple band pairs), there are hundreds of cases (and growing) that can possibly suffer from negative and/or deleterious effects including receiver de-sense due to distortion generated from a wireless communication device's own transmitting signals. To improve operation of a wireless communication device, one consideration is to try to keep TX related distortion as low as possible. Otherwise, when if there is sufficient TX related distortion to cause problems, very large RX de-sense may occur within the wireless communication device. This can result in significant cell coverage reduction.

Consider below an example of implementation examples in which communications may suffer negatively (e.g., from interference, distortion, etc.) from other communications within a communication system. For example, the proliferation of LTE UL inter-band CA is a very important method for the cellular system to increase the data throughput. However, de-sense of a wireless communication device's RX path and receiver related operations from TX signals may unfortunately present a major limitation to the system. Consider a few examples as follows:

Example 1: LTE UL Inter-Band CA—Band1 and Band 3 Operation

Band 1 TX1 frequency=1950 MHz
Band 3 TX2 frequency=1760 MHz
Band 1 RX1 frequency=2140 MHz
The 3rd order inter-modulation product from the combination of Band 1 TX1 and Band 3 TX2 can be at 2*1950 MHz−1760 MHz=2140 MHz, which is the targeted Band1 RX frequency. This can lead to a large Band 1 RX de-sense and typically the de-sense is estimated to be more than 20 dB.

Example 2: LTE UL Inter-Band CA—Band 3 and Band 5 Operation

Band 3 TX1 frequency=1721 MHz
Band 5 TX2 frequency=838 MHz
Band 5 RX1 frequency=883 MHz
The 2nd order inter-modulation product from the combination of Band 3 TX1 and Band 5 TX2 will be at 1721 MHz−838 Mhz=883 MHz which is the targeted Band5 RX frequency. This can lead to a large Band 5 RX de-sense and typically the de-sense is estimated to be more than 20 dB.

Note that many other similar cases may also be identified within such communication systems. For the very numerous cases described above that may possibly occur, distortion can occur because of the TX signals. By identifying the mechanism causing the distortion, correction signals can be generated inside digital baseband of the wireless communication device and then used to cancel the distortion in real operation.

Referring again to FIG. 2E, in operation, first base function generating 1 operates based on the transmitter (TX) signals (e.g., TX1 signal through TXm signal) to generate a first base function signal that then undergoes post-base function processing 1 to generate a first distortion signal. Examples of such post-base function processing may include frequency shift, delay, and/or low pass filter (LPF) operations to generate the first distortion signal that is provided to distortion signal combining. In other examples, the first base function signal is passed directly to the distortion signal combining without undergoing post-base function processing.

Similarly, second base function generating 1 operates based on the transmitter (TX) signals (e.g., TX1 signal through TXm signal) to generate a second base function signal that then undergoes post-base function processing 2 to generate a second distortion signal. Examples of such post-base function processing may include frequency shift, delay, and/or low pass filter (LPF) operations to generate the second distortion signal that is provided to distortion signal combining. In other examples, the second base function signal is passed directly to the distortion signal combining without undergoing post-base function processing. In some examples, additional base function generating (e.g., up to base function generating P, where P is a positive integer greater than or equal to 3 in this diagram) may be implemented with similar functionality. As also described above, note that as few as one base function may be implemented in some examples. In general, any number of base function generating elements, modules, functional blocks, circuitries, etc. may be implemented as may be needed based on which particular TX signals are being used and any inter-modulation interference that may be generated based on those particular TX signals being used.

Then, this implementation also includes distortion signal combining that operates by combining the respective distortion signals (or alternatively, the base function signals) to generate a correction signal corresponding to the m-th receiver (RX).

FIG. 3 is a diagram illustrating an embodiment 300 of a wireless communication device that is configured to perform distortion mitigation signal processing. The wireless communication device includes radio frequency (RF) interface (I/F) circuitry 310 that is configured to transmit and receive signal via one or more wireless communication channels using one or more antennas. The RF I/F circuitry 310 includes a front end 312 and a transceiver 314 that includes a number of transmitter (TX)-receiver (RX) pairs (shown as TX1 & RX1 and TX2 & RX2, and may optionally include up to m TX-RX pairs, TXm & RXm). The wireless communication device also includes processing circuitry 320. In some examples, the processing circuitry 320 is implemented as digital baseband circuitry. The processing circuitry 320 includes multiple digital TX-RX processing paths that each correspond respectively to one of the TX-RX pairs of the RF I/F circuitry 310.

For example, the processing circuitry 320 is coupled to the RF I/F circuitry 310 and that includes a multiple digital TX-RX processing paths. Considering the bottom of the diagram, a first digital TX-RX processing path includes a first digital front end (DFE) (shown as DFE1_1) is configured to process the first TX signal (e.g., shown as TX1 signal, such as provided from a first in-phase/quadrature (IQ) source, shown as IQ src 1) to generate a first TX DFE signal. A first digital to analog converter (DAC) (shown as DAC1) is configured to process the first TX DFE signal to generate a first analog (continuous-time) TX signal and to provide the first analog TX signal to the first TX (shown as TX1) of the first TX-RX pair. Also, a first analog to digital converter (ADC) circuitry (shown as ADC1) is configured to process a first analog RX signal received from the first RX (shown as RX1) of the first TX-RX pair to generate a first digital RX signal. A second DFE (shown as DFE1_2) is configured to process the first digital RX signal to generate a first RX DFE signal (shown as RX1 DFE signal). A combiner (e.g., a summer, a subtractor, or other appropriate circuitry configured to combine two signals or subtract one signal from the other) is configured to process the first RX DFE signal (shown as RX1 DFE signal) and the first correction signal (shown as RX1 corr. signal) to generate a first distortion compensated RX signal (shown as RX1 dist. comp. signal). In addition, and in some examples, a first RX distortion estimator receives the first TX signal (e.g., shown as TX1 signal) as well as TX signals from one or more of the other digital TX-RX processing paths within the processing circuitry 320 (e.g., including a second TX signal (e.g., shown as TX2 signal) and up to an m-th TX signal (e.g., shown as TXm signal) when m digital TX-RX processing paths are implemented within the processing circuitry 320). The other digital TX-RX processing paths operate similarly to this first digital TX-RX processing path based on the respective signaling and connectivity shown in the diagram. Also, additional details of various embodiments of such wireless communication devices are described in greater detail with reference to FIG. 9A and FIG. 9B among other diagrams.

In addition, in an implementation that includes one TX-RX pair operating in band 2 and another TX-RX pair operating in band 3, a second ADC circuitry (shown as ADC2) is configured to process a second analog RX signal received from a second RX (shown as RX2) of the second TX-RX pair to generate a second digital RX signal. This diagram shows an example of the overall block diagram of LTE UL inter-band CA operation. In this example, there are up to m paths (TX+RX) implemented within the wireless communication device. This means there are m TX paths and m RX paths. For one RX path (path x), the possible distortion from the total of m paths of TX can be written as follows:

$$\text{Distortion}_x = \Sigma_{N=2}^{\infty} \Sigma_{s=1}^{QN} a_s * e^{-j*w_s*t} * \Sigma_{i=1}^{m} TX_i^{l_i} * TX_i^{*k_i} \quad (\text{Eq 1})$$

where l1, l2, ... lm, k1, k2, ... km must satisfy N=l1+l2+ ... +lm+k1+k2+ ... +km and l1, l2, ... lm, k1, k2, ... km<N N is the order of the non-linear distortion.

Note that a base function may be implemented and viewed as being one of the terms in the product of terms function, $\Pi_{i=1}^{m} TX_i^{l_i} * TX_i^{*k_i}$, which is the TX distortion term that generates distortion near the target receiver path x operating frequency. In addition, note that $TX_1, TX_2, \ldots TX_m$ are the transmitter (TX) signals, and $TX_1^*, TX_2^*, \ldots TX_m^*$ are the respective conjugates of the TX signals. Note that Eq 1 above generally shows all possible based functions (e.g., $TX_i^{l_i} * TX_i^{*k_i}$), note that only one or more base functions corresponding to one or more base inter-modulation interference terms based on two or more of the respective TX signals that will negatively affect the operation of a wireless communication device are the only base function(s) needed and that are actually used in a wireless communication device. Moreover, considering an example that uses 3 or more TX signals (e.g., TX1, TX2, and TX3), there may be instances when only one or more base functions that is/are a function of 2 of these 3 TX signals are needed or used to compensate for distortion and/or interference (e.g., a first base function that is a function of TX1 and TX2, a second base function that is a function of TX1 and TX3, or a third base function that is a function of TX2 and TX3). Other examples include base functions that are based on all 3 TX signals (e.g., a first base function that is a function of TX1 and TX2 and a second base function that is a function of TX1 and TX3).

Considering an example that uses 4 or more TX signals (e.g., TX1, TX2, TX3, and TX4), there may be instances when only one or more base functions that is/are a function of 2 or 3 of these 4 TX signals are needed or used to compensate for distortion and/or interference (e.g., a second base function that is a function of TX1 and TX3 and also a third base function that is a function of TX3 and TX4 or only one base function that is a function of TX1 and TX2). Other examples include base functions that are based on all 4 TX signals.

The $e^{-j^* w_s^* t}$ term is the complex frequency shift due to the fact the center frequency TX distortion may be different by $w_s$ comparing to the target receiver path x operating center frequency as a function of time, t, for one base function.

$a_s$ represents the TX distortion signal level at receiver x for one base function. If the TX distortion to the targeted RX path has flat frequency response, $a_s$ will be one fixed value. If the TX distortion to the targeted RX path has non-flat frequency response, $a_s$ can be replaced with a multi-tap low pass filter as shown in FIG. 4.

The summation of s from 1 to $Q_N$ in Eq (1) means there are total of $Q_N$ possible combinations (base functions) under Nth order non-linearity that create distortion near the receiver path x operating frequency.

Note also that the RX1, RX2, . . . , RXm Distortion Estimator blocks are respectively configured to estimate the possible TX related distortions in each of respective receiver paths and reduce the impact by applying appropriate correction signals (shown as RX1 corr. signal, RX2 corr. signal, . . . RXm corr. signal). Such processing may be performed by subtracting the appropriate correction signal from the signal provided from the respective DFE in the RX path of the TX-RX processing path (e.g., subtracting RX1 corr. signal from RX1 DFE signal to generate RX1 dist. comp. signal).

Figure 4:
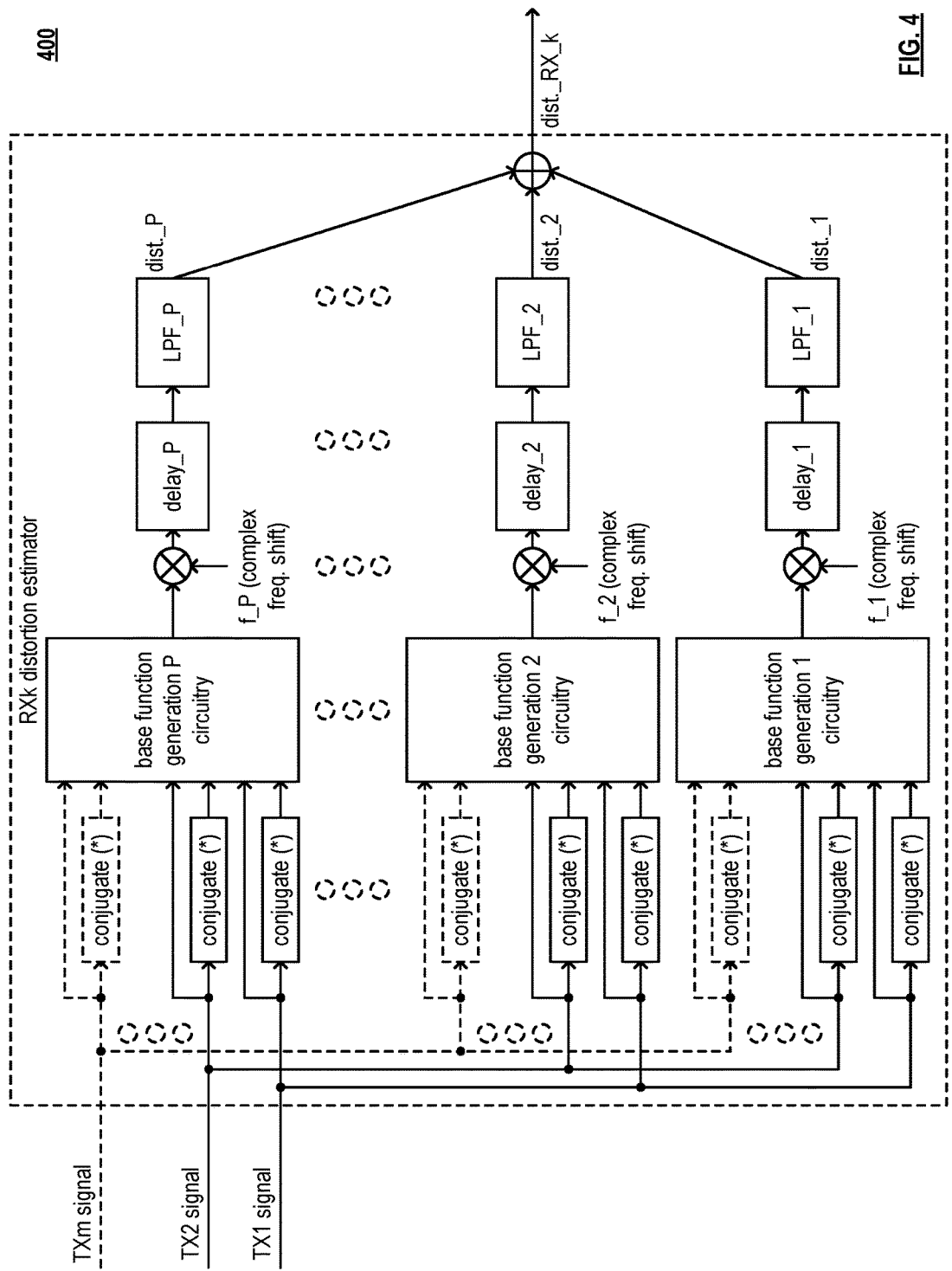
FIG. 4 is a diagram illustrating an embodiment of a distortion estimator of a wireless communication device that is configured to perform distortion mitigation signal processing.

FIG. 4 is a diagram illustrating an embodiment 400 of a distortion estimator of a wireless communication device that is configured to perform distortion mitigation signal processing. Consider a k-th RX distortion estimator (RXk distortion estimator) within the processing circuitry 320 of FIG. 3. The RXk distortion estimator receives the respective TX signals (TX$_1$, TX$_2$, . . . TX$_m$, such as up to TXm signal when m digital TX-RX processing paths are implemented within the processing circuitry 320) and also generates conjugates thereof (TX$_1$*, TX$_2$*, . . . TX$_m$*). Each of the respective P base function generation circuitries receives these respective TX signals and the conjugates thereof.

Considering the bottom of the diagram, a first base function is generated (e.g., by base function generation 1 circuitry) based on the selected TX signals and conjugates of TX signals. The frequency shift is implemented as described above and then a delay (delay_1) and complex low pass filter (LPF) (LPF_1) are implemented for each base function. Finally, a combination (e.g., a sum) of all P possible distortion signals (dist._1, dist._2, up to dist._2) is generated as the final correction signal for path k (dist._RX_k). Note that some examples operate using only one of the P base function generation circuitries. Other examples operate using two or more of the P base function generation circuitries.

Also, note that this final correction signal for this path k among the RX x paths (dist._RX_k) is specific to this path k. Other generated final correction signals for the other RX x paths will be specific to the other RX paths (e.g., dist._RX_1 for path 1, dist._RX_2 for path 1, and so on). The base function generation generally follows each term in Eq (1) i.e. $\Pi_{l=1}^{m} TX_i^{l_i} * TX_i^{*k_i}$ for the selected l1, l2, . . . lm, k1, k2, . . . km. In most cases, only very limited number of base functions are needed, which may significantly simplify the implementation.

For example, consider the "Example 1" described above, e.g., band 1 (TX1) and Band 3 (TX2) LTE UL CA operation, only TX1$^2$*TX2* base function is needed. In this example, both TX1 or TX2 and victim RX path have flat frequency response from the front-end duplexer (which may be true in most cases). As such, a complex LPF block in FIG. 4 can be reduced to a single complex gain, e.g., one tap filter. The complex gain can be determined based on least mean square (LMS) processing. First, the base function (BF) is created, and then it is time aligned with the corresponding received RX signal. Then, the resulting error (Error) may be determined as follows:

$$\text{Error} = \Sigma_{t=0}^{n} RX_t - G^* BF_t \quad \text{(Eq 2)}$$

Where $RX_t$ is the measured RX signal at time t, G is the complex gain to be determined, and $BF_t$ is the base function value at time t.

From $$\frac{dError}{dG} = 0,$$

the following can be derived $$G = \frac{\sum BF_t^* * RX_t}{\sum BF_t^* * BF_t} \quad \text{(Eq 3)}$$

Note that the * superscript indicates conjugate of $BF_t$ (i.e., $BF_t^*$ is the conjugate of $BF_t$). Also, note that value G can be obtained either through a factory-based one-time calibration (e.g., such as a factory calibration during assembly) or live calibration during operation (and may also be updated one or more times later when in operation). With the estimated value G, predefined complex frequency shift and delay, the TX generated distortion signal in the receive path can then be minimized.

Figure 5:
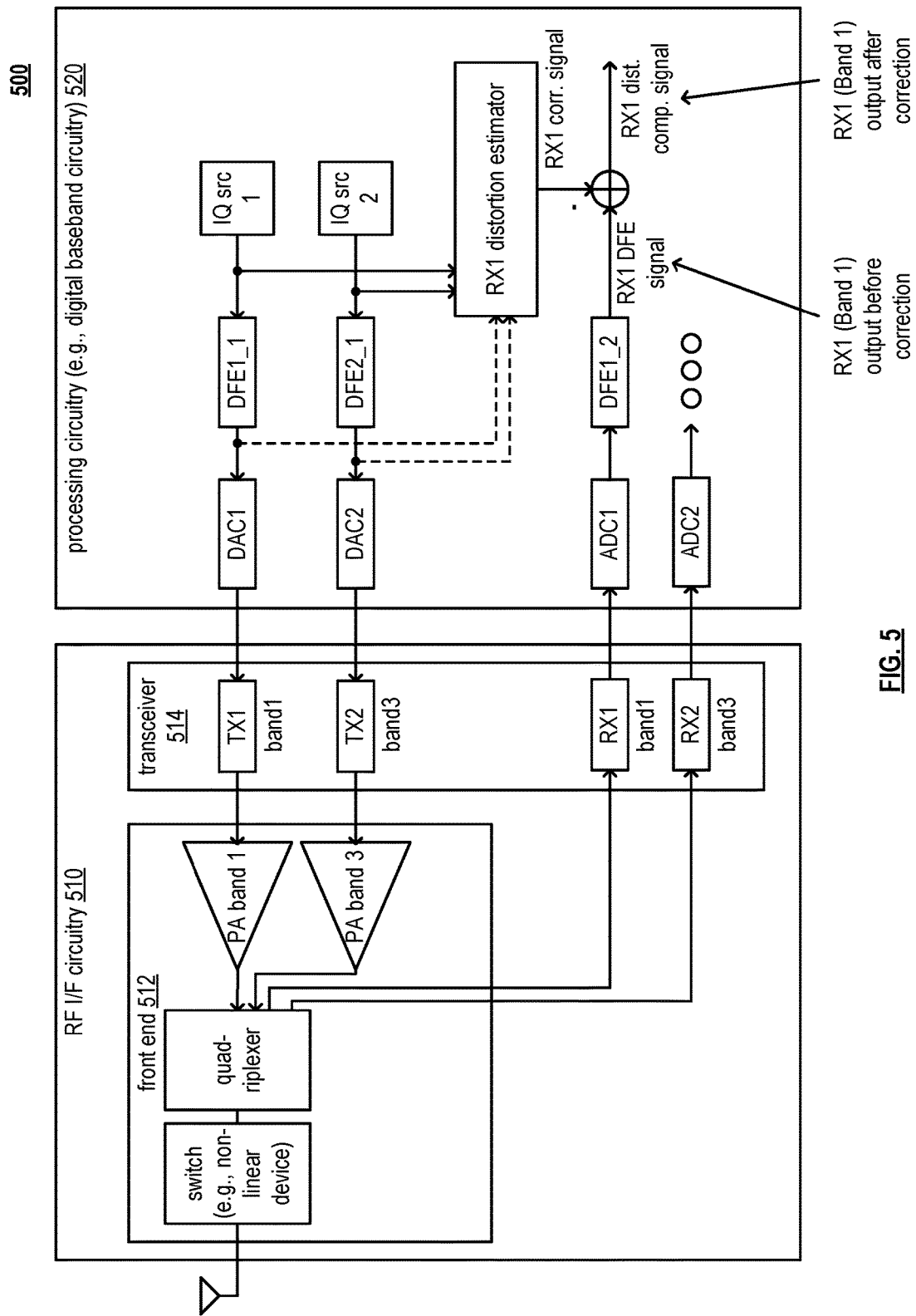
FIG. 5 is a diagram illustrating another embodiment of a wireless communication device that is configured to perform distortion mitigation signal processing.

FIG. 5 is a diagram illustrating another embodiment 500 of a wireless communication device that is configured to perform distortion mitigation signal processing. In this diagram, Band 1 and Band 3 LTE UL inter-band CA operation with digital correction may be performed by a wireless communication device. This wireless communication device includes RF I/F circuitry 510 and processing circuitry 520 (e.g., that may be implemented as digital baseband circuitry in some examples). The RF I/F circuitry 510 includes a front end 512 and a transceiver 514. The front end 512 includes a switch (e.g., a non-linear device) that is coupled or connected to a quadriplexer that is coupled or connected to a power amplifier (PA) band 1 that is coupled or connected to a TX1 (corresponding to band 1) and also a PA band 3 that is coupled or connected to a TX2 (corresponding to band 3). The quadriplexer also is coupled or connected to RX1 (corresponding to band 1).

Within the processing circuitry 520, a first I,Q source (IQ src 1) is coupled or connected to DFE1_1 that is coupled or connected to DAC1 that is coupled or connected to TX1 of transceiver 514 within the RF I/F circuitry 510. Also, a second I,Q source (IQ src 2) is coupled or connected to DFE2_1 that is coupled or connected to DAC2 that is coupled or connected to TX2 of transceiver 514 within the RF I/F circuitry 510. In addition, TX signals provided from IQ src 1 and IQ src 2 (or alternatively, DFE signals provided from DFE1_1 and DFE2_1) are provided to a RX1 distortion estimator that processes those inputs signal to generate an RX1 correction signal (RX1 corr. signal).

Also within the processing circuitry 520, an ADC1 is coupled or connected to RX1 and is also coupled or connected to DFE1_2 that generates a RX1 DFE signal that undergoes processing with the RX1 correction signal (RX1 corr. signal) to generate a RX1 distortion compensated signal (RX1 distortion comp. signal). Additional similar elements may be implemented to perform distortion estimation and compensation such as is particularly shown with respect to RX1 distortion estimator (e.g., another DFE such as DFE2_2 (not shown) as would be connected or coupled to ADC2, a RX2 distortion estimator (not shown), and other corresponding elements, etc.).

In this diagram and example, note that the 3rd order non-linearity of the switch is the dominant distortion contributor for Band 1 receiver.

Figure 6:
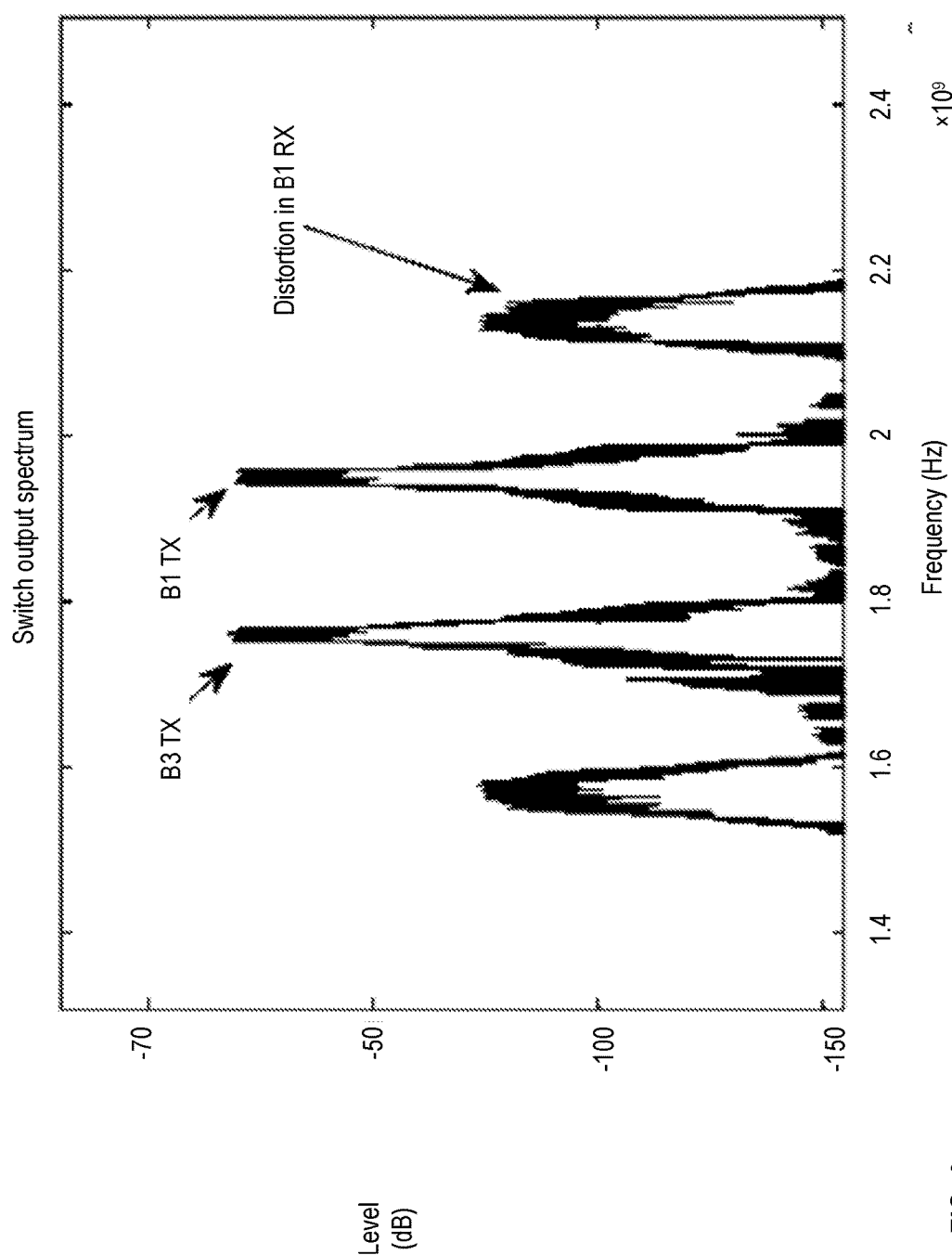
FIG. 6 is a diagram illustrating an example of a switch output spectrum showing distortion level as a function of frequency within a multi-band communication device.

FIG. 6 is a diagram illustrating an example 600 of a switch output spectrum showing distortion level as a function of frequency within a multi-band communication device. This diagram shows the switch output spectrum of Band 1 & Band 3 LTE CA operation. As described above, for this case, the base function is $TX1^2 * TX2^*$.

Figure 7:
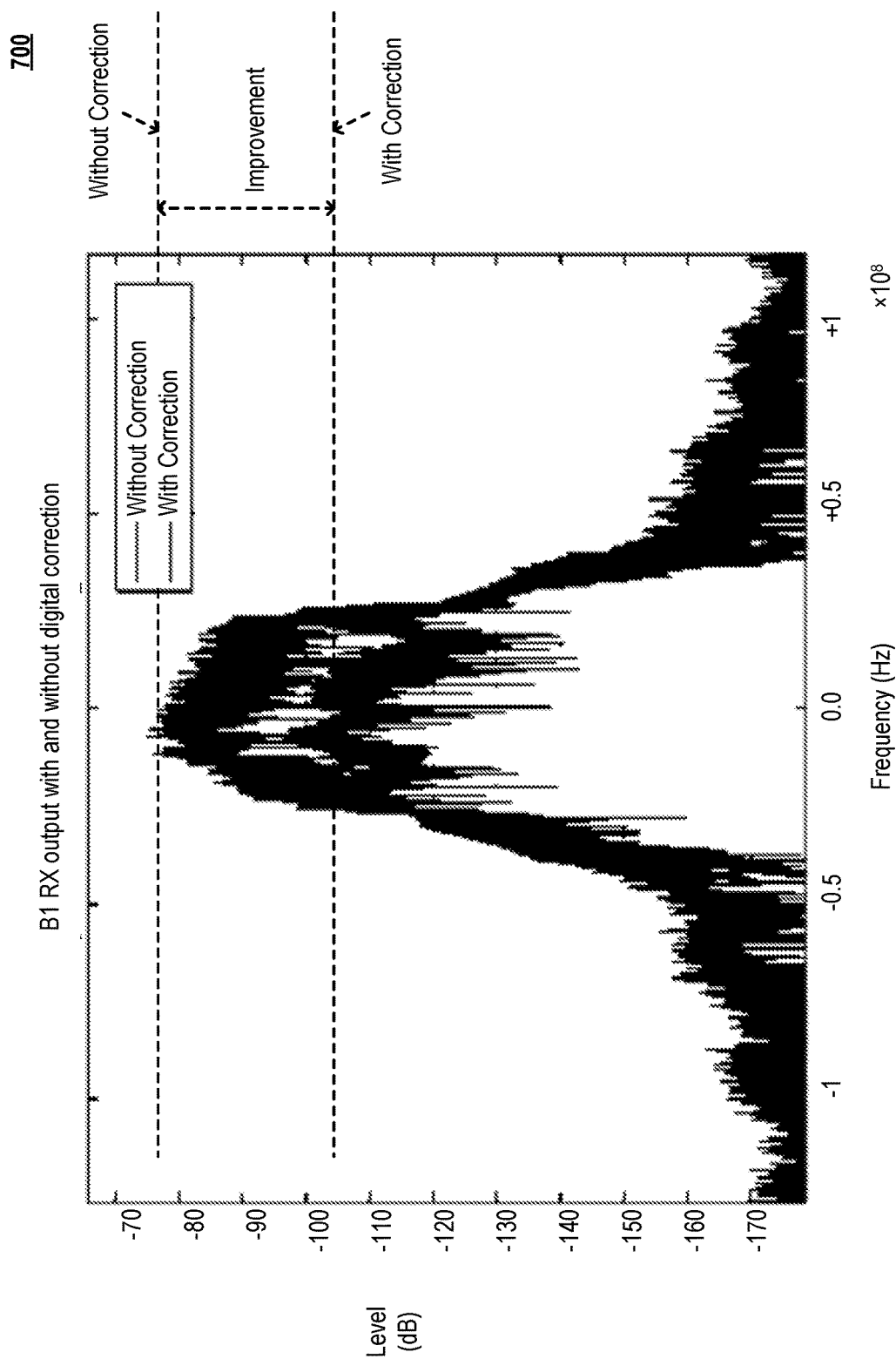
FIG. 7 is a diagram illustrating an example of a receiver output level as a function of frequency within a multi-band communication device with and without distortion and interference mitigation.

FIG. 7 is a diagram illustrating an example 700 of a receiver output level as a function of frequency within a multi-band communication device with and without distortion and interference mitigation. This diagram shows the band 1 receiver distortion signal before and after the correction using the invented method. Significant distortion reduction (>20 dB) is observed using the distortion estimation and compensation means described herein.

Figure 8A:
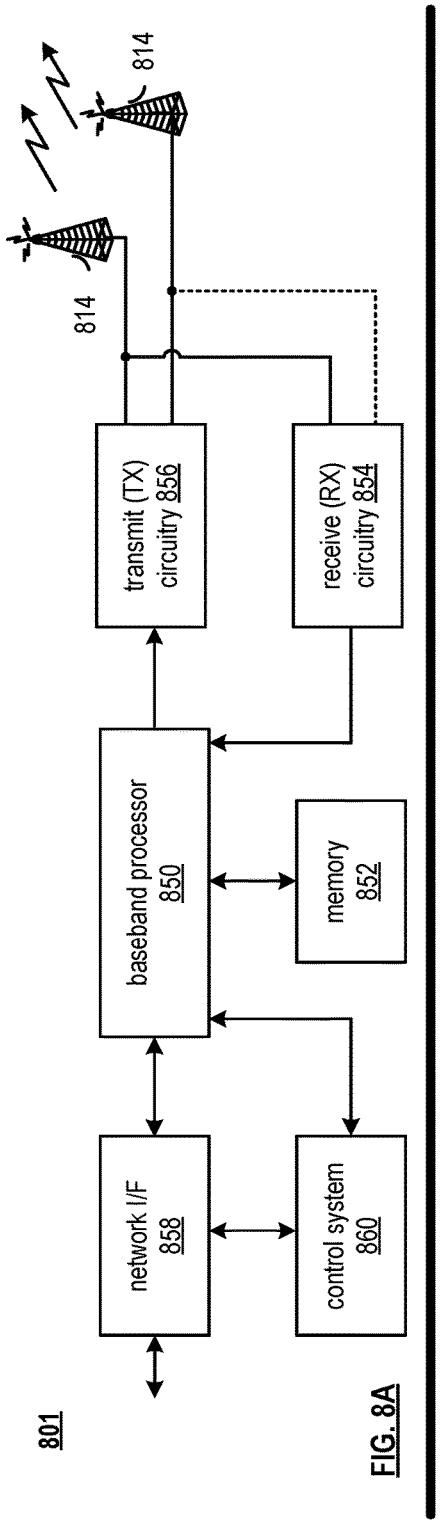
FIG. 8A is a diagram illustrating an embodiment of a WCAN device.

FIG. 8A is a diagram illustrating an embodiment 801 of a WCAN device. A high-level description of a WCAN device that may be operative and/or implemented within various embodiments of a communication system as described above is illustrated. The WCAN device generally includes a control system 860, a baseband processor 850, memory 852, transmit (TX) circuitry 856, receive (RX) circuitry 854, multiple antennas 814, and one or more communication interfaces that can include a network interface 858, or subsets and variations thereof. The memory 852 may be any type of memory that is operative to store software and/or data. The receive (RX) circuitry 854 is configured to receive radio frequency signals bearing information from one or more remote UE's (e.g., such as described with reference to FIG. 9A and/or FIG. 9B). In some examples, a low noise amplifier and a filter (not shown) cooperate to amplify and remove broadband interference from the signal for processing. down-conversion and digitization circuitry (not shown) will then down convert the filtered, received signal to an intermediate or baseband frequency signal, which is then digitized into one or more digital streams.

The baseband processor 850 is configured to process the digitized received signal to extract the information or data bits conveyed in the received signal. In some examples, this processing typically comprises demodulation, decoding, and error correction operations. In certain implementations, the baseband processor 850 is implemented in one or more digital signal processors (DSPs), application specific integrated circuits (ASICs), and/or both. The received information is then sent to an associated network via the network interface 858 or transmitted to another User Equipment (UE), mobile terminal, etc. serviced by the WCAN device.

On the transmit side, the baseband processor 850 receives digitized data, which may represent voice, data, control information, and/or other information, from the network interface 858 under the control of the control system 860, and encodes the data for transmission. The encoded data is output to the transmit (TX) circuitry 856, where it is modulated by a carrier signal having a desired transmit frequency or frequencies.

The baseband processor 850 may be configured to perform encoding of one or more bits to generate one or more coded bits used to generate the modulation data (or generally, data). For example, the baseband processor 850 may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

A power amplifier (not shown) will amplify the modulated carrier signal to a level appropriate for transmission, and deliver the modulated carrier signal to the antennas 814 through a matching network (not shown). In one embodiment of the present disclosure, the WCAN device transmits signals using both antennas 814, but receives signals using a single antenna 814. In general, any desired configuration or mode of the operation of the one or more antennas 814 may be used to effectuate transmitting and receiving of signals (e.g., single-input-single-output (SISO) communication, single-input-multiple-output (SIMO), multiple-input-single-output (MISO), and/or multiple-input-multiple-output (MIMO)).

Note that other such transmit/receive circuitry as described with respect to this WCAN device may be implemented for optical, digital subscriber line (DSL), or any other communication scheme. For example, when collocated with a transmit/receive point, a central access unit such as a WCAN device could reuse the baseband processor and other components of the transmit/receive point as necessary (e.g. interfaces for communicating with other transmit/receive points).

Figure 8B:
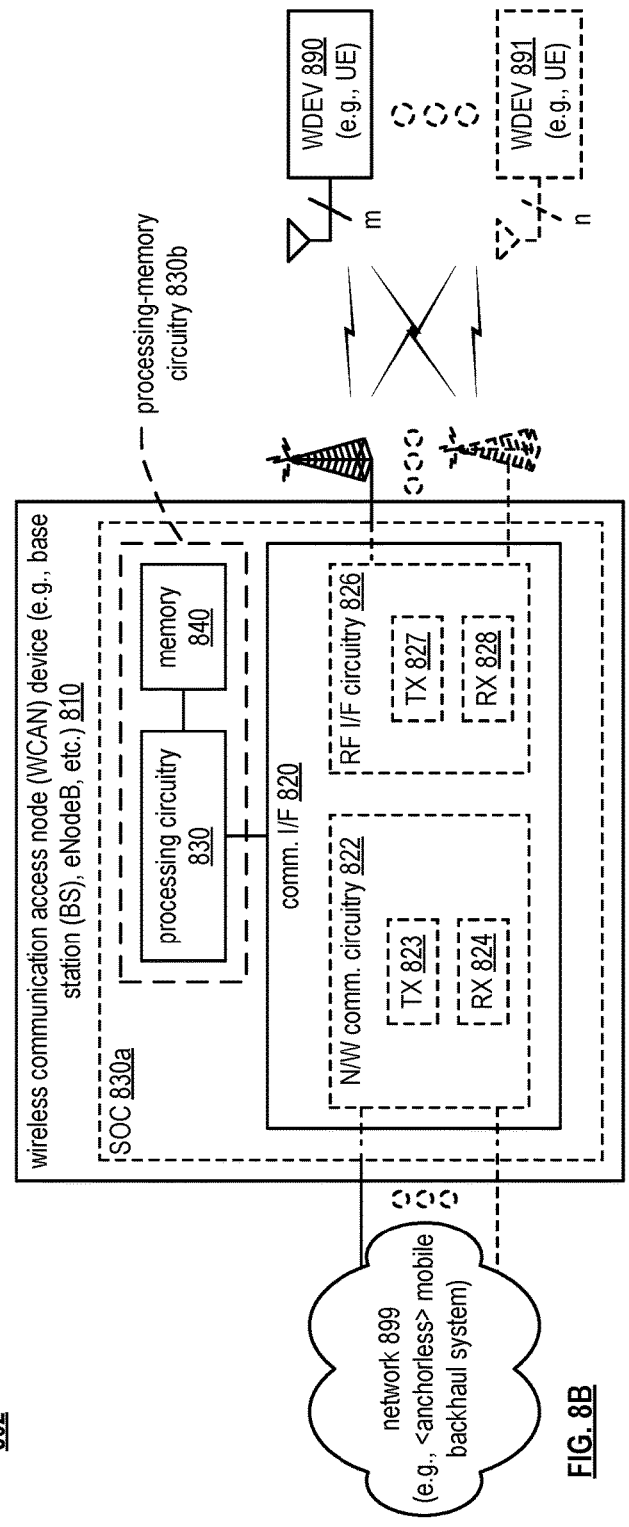
FIG. 8B is a diagram illustrating another embodiment of a WCAN device.

FIG. 8B is a diagram illustrating another embodiment 802 of a WCAN device 810. The WCAN device 810 includes a communication interface 820 to perform transmitting and/or receiving of at least one signal, symbol, packet, frame, etc. (note that general reference to packet or frame may be used interchangeably). In some examples, the communication interface 820 is implemented to include radio frequency (RF) interface (I/F) circuitry 826 (e.g., using a transmitter (TX) 827 and a receiver (RX) 828, which may be separate circuitry, modules, etc. or may be integrated into and part of the RF interface (I/F) circuitry 826) and network communication circuitry 822 (e.g., using a transmitter (TX) 823 and a receiver (RX) 824, which may be separate circuitry, modules, etc. or may be integrated into and part of the network communication circuitry 822)).

The RF interface (I/F) circuitry 826 is configured to support wireless communication with one or more UEs (e.g., via one or more antennas, remote radio heads (RRHs), transmit/receive (TX/RX) points, etc. and/or one or more base stations (BSs), Evolved Nodes B (eNodeBs), etc.). The network communication circuitry is configured to support communications (e.g., wirelessly, wire line based, optically, etc.) with a network 899 (e.g., such as a mobile backhaul communication system that may be implemented as an anchorless mobile backhaul communication system including with respect to other examples and embodiments herein, a cloud network, and/or any other type of communication system).

Generally speaking, the communication interface 820 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the WCAN device 810 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the WCAN device 810 also includes processing circuitry 830, and an associated memory 840, to execute various operations including interpreting at least one signal, symbol, packet, and/or frame transmitted to wireless communication device 890 (e.g., a UE) and/or wireless communication device 891 (e.g., another UE) and/or received from the wireless communication device 890 and/or wireless communication device 891 (e.g., UEs). The WCAN device 810 and wireless communication device 890 (and/or 891) may be implemented using at least one integrated circuit in accordance with any desired configuration or combination of components, modules, etc. within at least one integrated circuit. Also, the WCAN device 810 and wireless communication device 890 (and/or 891) may each include one or more antennas for transmitting and/or receiving of at least one packet and/or frame (e.g., wireless communication device 890 may include m antennas, and wireless communication device 891 may include n antennas, where m and n are positive integers and may be the same positive integer or different positive integers).

Also, in some examples, note that one or more of the processing circuitry 830, the communication interface 820 (including the respective TX(s) and/or RX(s) thereof), and/ or the memory 840 may be implemented in one or more "processing modules," "processing circuits," "processors," and/or "processing units" or their equivalents. Considering one example, a system-on-a-chip (SOC) 830a may be implemented to include functionality as performed by the processing circuitry 830, the communication interface 820 (including the respective TX(s) and/or RX(s) thereof), and the memory 840 (e.g., SOC 330a being a multifunctional, multi-module integrated circuit that includes multiple components therein). Considering another example, processing-memory circuitry 830b may be implemented to include functionality as performed by the processing circuitry 830 and the memory 840 yet the communication interface 820 is a separate circuitry (e.g., processing-memory circuitry 830b is a single integrated circuit that performs functionality of processing circuitry and a memory and is coupled to and also interacts with the communication interface 820).

Considering even another example, two or more processing circuitries may be implemented to include the processing circuitry 830, the communication interface 820 (including the respective TX(s) and/or RX(s) thereof), and the memory 840. In such examples, such a "processing circuitry" or "processing circuitries" (or "processor" or "processors") is/are configured to perform various operations, functions, communications, etc. as described herein. In general, the various elements, components, etc. shown within the device 810 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the WCAN device 810 includes both processing circuitry 830 and communication interface 820 configured to perform various operations. In other examples, the WCAN device 810 includes SOC 830a configured to perform various operations. In even other examples, the WCAN device 810 includes processing-memory circuitry 830b configured to perform various operations. Generally, such operations include generating, transmitting, etc. signals intended for one or more other devices (e.g., wireless communication devices 890 through 891) and receiving, processing, etc. other signals received for one or more other devices (e.g., wireless communication devices 890 through 891).

In some examples, note that the communication interface 820, which is coupled to the processing circuitry 830, that is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the device 810 may be communicated via any of these types of communication systems.

Figure 9A:
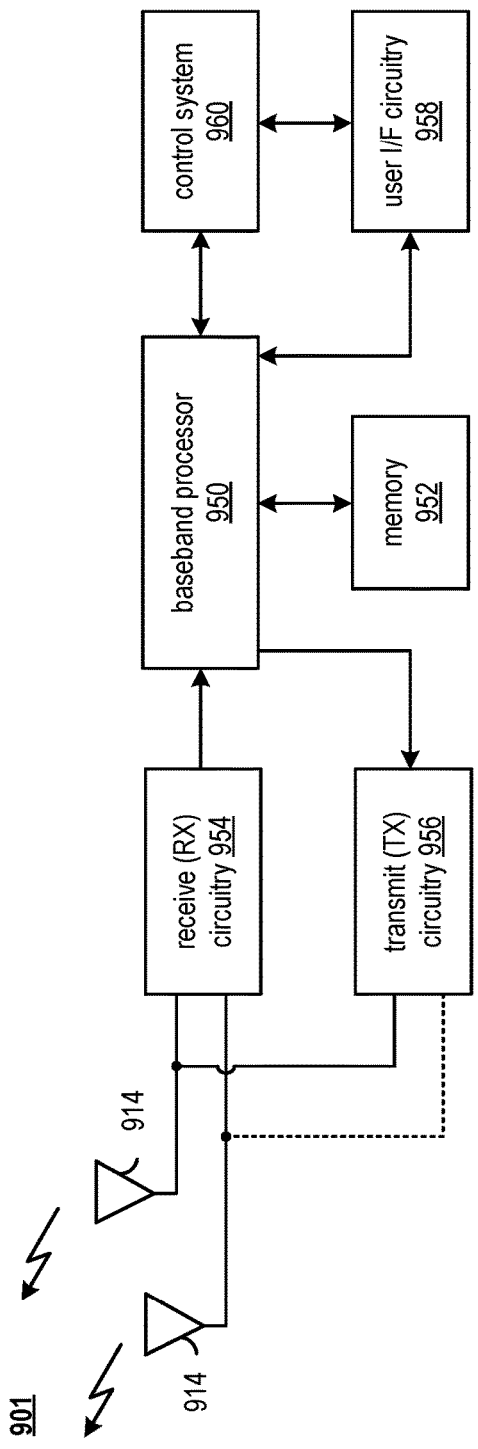
FIG. 9A is a diagram illustrating an embodiment of a wireless communication device (e.g., a User Equipment (UE)).

FIG. 9A is a diagram illustrating an embodiment 901 of a wireless communication device (e.g., a User Equipment (UE)). A high-level description of the components of a UE is shown. Similarly, to the transmit/receive point 1102, the UE 1202 will include a control system 960, a baseband processor 950, memory 952, transmit (TX) circuitry 956, receive (RX) circuitry 954, multiple antennas 914, and user interface circuitry 958, or subsets and variations thereof. The receive circuitry 1224 receives radio frequency signals bearing information from one or more WCAN devices. In some examples, a low noise amplifier and a filter (not shown) cooperate to amplify and remove broadband interference from the signal for processing. Down conversion and digitization circuitry (not shown) will then down convert the filtered, received signal to an intermediate or baseband frequency signal, which is then digitized into one or more digital streams.

The baseband processor 950 processes the digitized received signal to extract the information or data bits conveyed in the received signal. In some examples, this processing typically comprises demodulation, decoding, and error correction operations. In certain implementations, the baseband processor 950 is implemented in one or more digital signal processors (DSPs), application specific integrated circuits (ASICs), and/or both.

For transmission, the baseband processor 950 receives digitized data, which may represent voice, data, control information, and/or other information, from the control system 960 and/or the user interface circuitry 958, which it encodes for transmission. The encoded data is output to the transmit circuitry 956, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 914 through a matching network (not shown). The UE may receive signals using both antennas 914, but transmits signals using a single antenna 914.

In orthogonal frequency division multiplexing (OFDM) modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any particular carrier is lower than when a single carrier is used.

OFDM modulation may require the performance of an Inverse Discrete Fourier Transform (IDFT) on the information to be transmitted. For demodulation, the performance of a Discrete Fourier Transform (DFT) on the received signal is required to recover the transmitted information. In practice, the IDFT and DFT may be provided by digital signal processing carrying out an Inverse Fast Fourier Transform (IFFT) and Fast Fourier Transform (FFT), respectively. Accordingly, the characterizing feature of OFDM modulation is that orthogonal carrier waves are generated for multiple bands within a transmission channel. The modulated signals are digital signals having a relatively low transmission rate and operative to stay within their respective bands. The individual carrier waves are not modulated directly by the digital signals. Instead, all carrier waves are modulated at once by IFFT processing.

Single Carrier FDMA (SC-FDMA) modulation differs from OFDM modulation in that SC-FDMA uses a DFT block before mapping symbols to sub-carriers and that it uses a parallel-to-serial unit after the IFDT block. Otherwise SC-FDMA modulation is otherwise similar to OFDM modulation.

OFDM is used for at least the downlink transmission from WCAN devices to UEs. For example, each WCAN device may be equipped with n transmit antennas 814, and each UE is equipped with m receive antennas 914. Notably, the respective antennas can be used for reception and transmission using appropriate duplexers or switches and are so labeled only for clarity. Also, in general, any desired configuration or mode of the operation of the one or more antennas 914 may be used to effectuate transmitting and receiving of signals (e.g., single-input-single-output (SISO) communication, single-input-multiple-output (SIMO), multiple-input-single-output (MISO), and/or multiple-input-multiple-output (MIMO)).

Figure 9B:
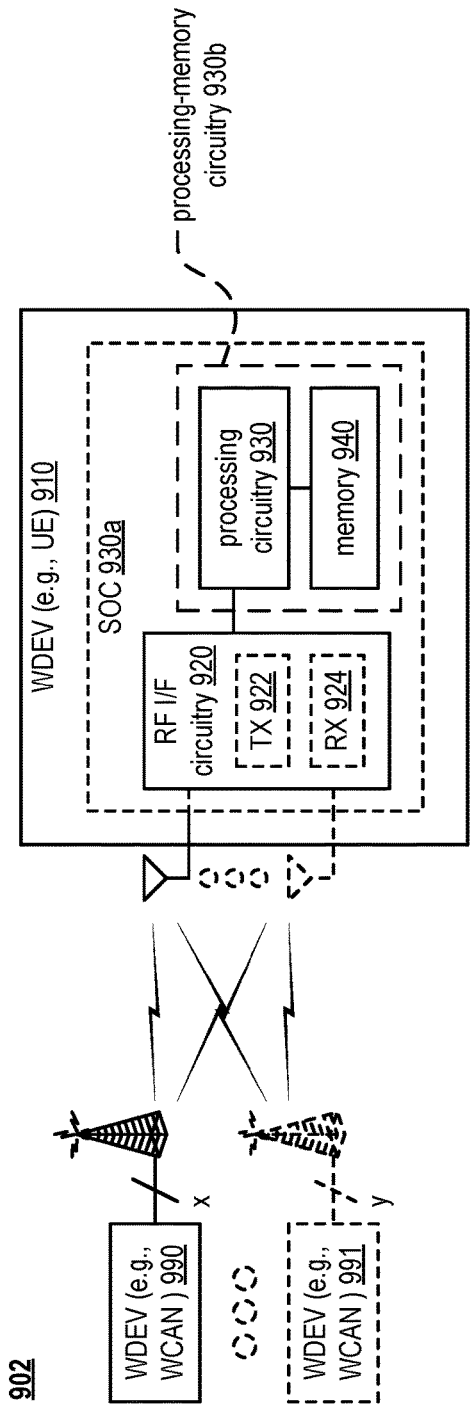
FIG. 9B is a diagram illustrating another embodiment of a wireless communication device (e.g., a UE).

FIG. 9B is a diagram illustrating another embodiment 902 of a wireless communication device (e.g., a UE). A wireless communication device 910 (e.g., which may be any UE such as described herein including with reference to FIG. 1) is in communication with another wireless communication device 990 (and/or any number of other wireless communication devices up through another wireless communication device 991) via a transmission medium. In some examples, the wireless communication device 990 is a WCAN device, and/or the wireless communication device 991 is another WCAN device. The wireless communication device 910 includes radio frequency (RF) interface (I/F) circuitry 920 to perform wireless transmitting and/or receiving of at least one signal, symbol, packet, frame, etc. (e.g., using a transmitter (TX) 922 and a receiver (RX) 924, which may be separate circuitry, modules, etc. or may be integrated into and part of the RF interface (I/F) circuitry 920) (note that general reference to packet or frame may be used interchangeably).

Generally speaking, the RF interface (I/F) circuitry 920 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 910 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the wireless communication device 910 also includes processing circuitry 930, and an associated memory 940, to execute various operations including interpreting at least one signal, symbol, packet, and/or frame transmitted to wireless communication device 990 and/or received from the wireless communication device 990 and/or wireless communication device 991. The wireless communication devices 910 and 990 (and/or 991) may be implemented using at least one integrated circuit in accordance with any desired configuration or combination of components, modules, etc. within at least one integrated circuit.

Also, the wireless communication devices (e.g., a wireless communication device such as shown using abbreviations WDEV in certain of the diagrams) 910, 990, and/or 991 may each include or be coupled to one or more antennas [such as x antennas for wireless communication device 990 and y antennas for wireless communication device 991, where x and y are positive integers and may be the same positive integer or different positive integers] remote radio heads (RRHs), transmit/receive (TX/RX) points, etc. and/or one or more base stations (BSs), eNodeBs, etc. for transmitting and/or receiving of at least one packet and/or frame.

Also, in some examples, note that one or more of the processing circuitry 930, the RF interface (I/F) circuitry 920 (including the TX 922 and/or RX 924 thereof), and/or the memory 940 may be implemented in one or more "processing modules," "processing circuits," "processors," and/or "processing units" or their equivalents. Considering one example, a system-on-a-chip (SOC) 930a may be implemented to include the processing circuitry 930, the RF interface (I/F) circuitry 920 (including the TX 922 and/or RX 924 thereof), and the memory 940 (e.g., SOC 330a being a multifunctional, multi-module integrated circuit that includes multiple components therein). Considering another example, processing-memory circuitry 930b may be implemented to include functionality as performed by the processing circuitry 930 and the memory 940 yet the RF interface (I/F) circuitry 920 is a separate circuitry (e.g., processing-memory circuitry 930b is a single integrated circuit that performs functionality of processing circuitry and a memory and is coupled to and also interacts with the RF interface (I/F) circuitry 920).

Considering even another example, two or more processing circuitries may be implemented to include the processing circuitry 930, the RF interface (I/F) circuitry 920 (including the TX 922 and/or RX 924 thereof), and the memory 940. In such examples, such a "processing circuitry" or "processing circuitries" (or "processor" or "processors") is/are configured to perform various operations, functions, communications, etc. as described herein. In general, the various elements, components, etc. shown within the device 910 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the device 910 includes both processing circuitry 930 and RF interface (I/F) circuitry 920 configured to perform various operations. In other examples, the device 910 includes SOC 930a configured to perform various operations. In even other examples, the device 910 includes processing-memory circuitry 930b configured to perform various operations. Generally, such operations include generating, transmitting, etc. signals intended for one or more other devices (e.g., device 990 through 991) and receiving, processing, etc. other signals received for one or more other devices (e.g., device 990 through 991).

In some examples, note that the wireless communication device 910 includes a communication interface that is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the device 910 may be communicated via any of these types of communication systems.

Figure 10B:
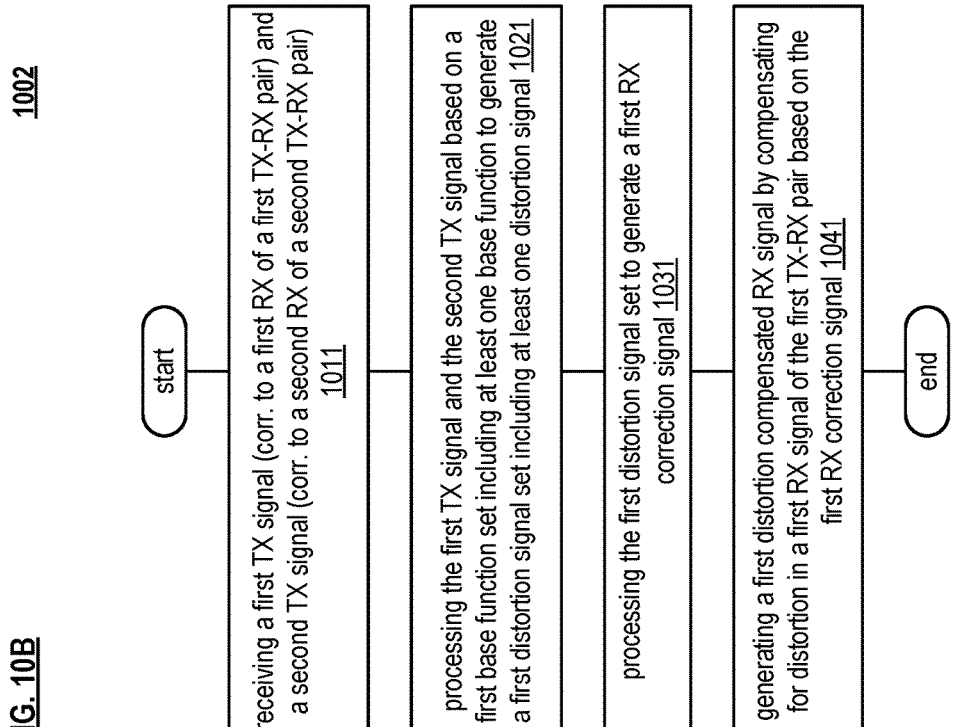
FIG. 10B is a diagram illustrating another embodiment of a method for execution by one or more communication devices.
Figure 10A:
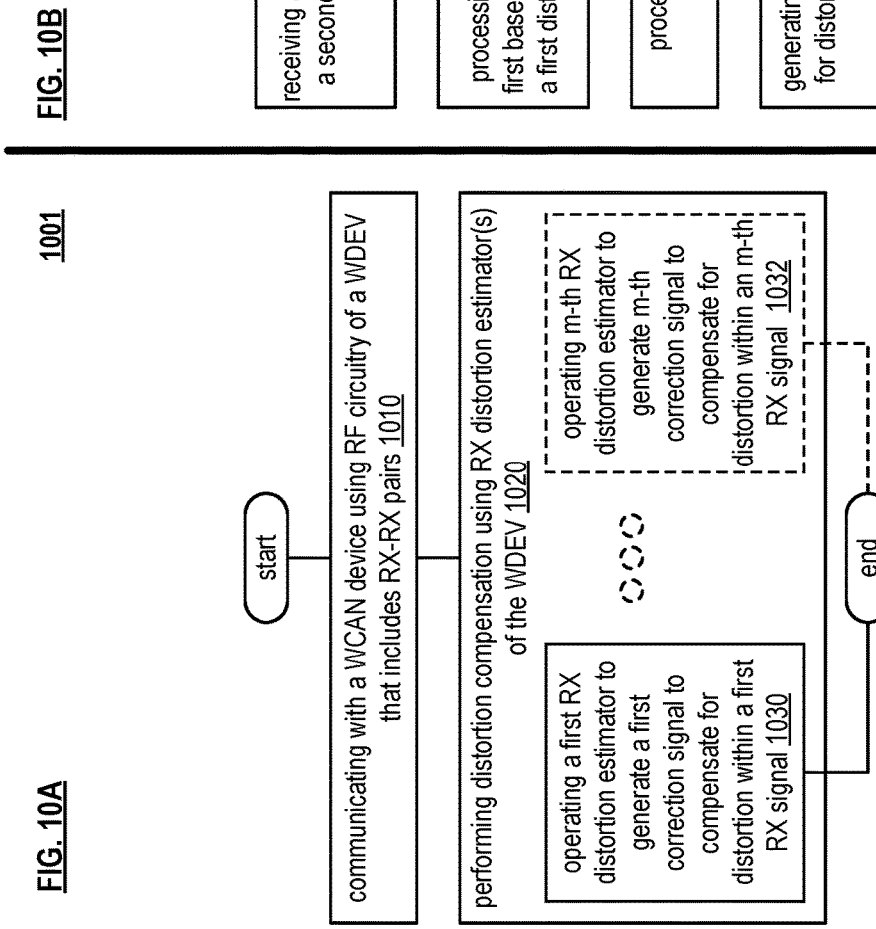
FIG. 10A is a diagram illustrating an embodiment of a method for execution by one or more communication devices.

FIG. 10A is a diagram illustrating an embodiment of a method 1001 for execution by one or more communication devices. The method 1001 operates in step 1010 by communicating with a wireless communication access node (WCAN) device using radio frequency (RF) interface (I/F) circuitry of a wireless communication device that includes transmitter (TX)-receiver (RX) pairs. The method 1001 continues in step 1020 by performing distortion compensation using one or more RX distortion estimators of the wireless communication device.

The method 1001 operates by performing such distortion compensation in step 1030 by operating a first RX distortion estimator to generate a first correction signal to compensate for distortion within a first RX signal. In some examples, the method 1001 also operates by performing such distortion compensation in step 1032 by operating an m-th RX distortion estimator to generate an m-th correction signal to compensate for distortion within an m-th RX signal.

FIG. 10B is a diagram illustrating another embodiment of a method 1002 for execution by one or more communication devices. The method 1002 operates by performing distortion compensation using a RX distortion estimator of a wireless communication device. Such operations based on the method 1002 may be based on and/or in accordance with communicating with another wireless communication device using a plurality of transmitter (TX)-receiver (RX) pairs.

The method 1002 operates in step 1011 by receiving a first TX signal (e.g., corresponding to a first TX of the first TX-RX pair) and a second TX signal (e.g., corresponding to a second TX of a second TX-RX pair). The method 1002 continues in step 1021 by processing the first TX signal and the second TX signal based on a first base function set including at least one base function to generate a first distortion signal set including at least one distortion signal.

The method 1002 then operates in step 1031 by processing the first distortion signal set to generate a first RX correction signal. The method 1002 then continues in step 1041 by generating a first distortion compensated RX signal by compensating for distortion in a first RX signal of the first TX-RX pair based on the first RX correction signal.

In some examples, a variant of the method 1001 and/or 1002 continues by operating a first RX distortion estimator by processing the first TX signal, a conjugate of the first TX signal, the second TX signal, and a conjugate of the second TX signal based on the first base function set to generate the first distortion signal set.

Other variants of the method 1001 and/or 1002 continue by operating a first RX distortion estimator by processing the first TX signal and the second TX signal based on a frequency shift, a delay, and/or a low pass filter (LPF) to generate the first distortion signal set. Even variants of the method 1001 and/or 1002 continue by operating a first RX distortion estimator by processing the first TX signal and the second TX signal based an environmental operational parameter, a local operational parameter corresponding to the wireless communication device, and/or a remote operational parameter corresponding to a wireless device configured to communicate with the wireless communication device.

In some examples of a wireless communication device implemented to execute the method 1001 and/or 1002 or variants thereof, such a first RX distortion estimator is within a digital baseband circuitry that includes a first digital TX-RX processing path. Certain variants of the method 1001 and/or 1002 continue by operating a first digital front end (DFE) to process the first TX signal to generate a first TX DFE signal and by operating a first digital to analog converter (DAC) to process the first TX DFE signal to generate a first analog TX signal and to provide the first analog TX signal to the first TX of the first TX-RX pair. Such variants of the method 1001 and/or 1002 continue by operating a first analog to digital converter (ADC) circuitry to process a first analog RX signal received from the first RX of the first TX-RX pair to generate a first digital RX signal and by operating a second DFE to process the first digital RX signal to generate a first RX DFE signal.

Other variants of the method 1001 and/or 1002 continue by operating a second RX distortion estimator by receiving the first TX signal corresponding to the first TX of the first TX-RX pair and the second TX signal corresponding to the second TX of the second TX-RX pair. Other variants of the method 1001 and/or 1002 continue by operating the second RX distortion estimator by processing the first TX signal and the second TX signal based on a second base function set including at least one base function to generate a second distortion signal set including at least one distortion signal and also processing the second distortion signal set to generate a second RX correction signal. Such variants of the method 1001 and/or 1002 continue by operating a first RX distortion estimator by generating a second distortion compensated RX signal by compensating for distortion in a second RX signal of the second TX-RX pair based on the second RX correction signal.

Other variants of the method 1001 and/or 1002 continue by operating the first TX-RX pair to communicate via at least one wireless communication channel with at least one wireless communication access node (WCAN) device based on a first band pair of the wireless communication channel and also operating the second TX-RX pair to communicate via the at least one wireless communication channel with the at least one WCAN device based on a second band pair of the wireless communication channel.

Note that within certain variants of the method 1001 and/or 1002 the first base function includes a first predetermined product term based on the first TX signal and the second TX signal, and the second base function includes a second predetermined product term based on the first TX signal and the second TX signal.

Figure 11:
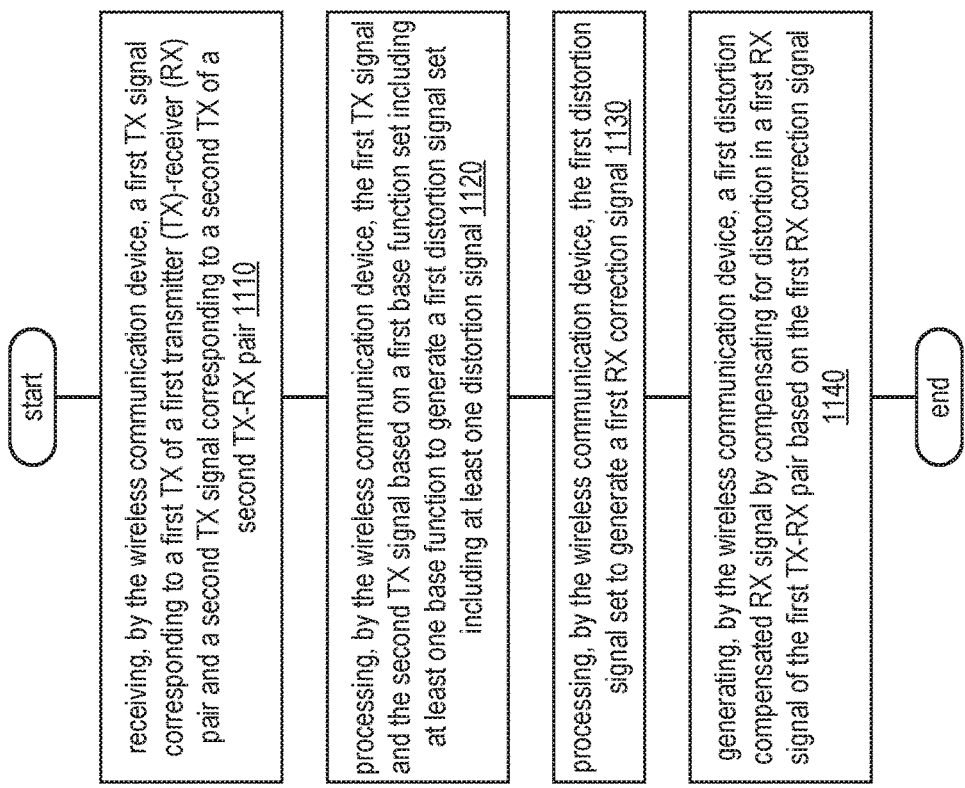
FIG. 11 is a diagram illustrating another embodiment of a method for execution by one or more communication devices.

FIG. 11 is a diagram illustrating another embodiment of a method 1100 for execution by one or more communication devices. The method 1100 operates in step 1110 by receiving, by the wireless communication device, a first TX signal corresponding to a first TX of a first transmitter (TX)-receiver (RX) pair and a second TX signal corresponding to a second TX of a second TX-RX pair. The method 1100 also operates in step 1120 by processing, by the wireless communication device, the first TX signal and the second TX signal based on a first base function set including at least one base function to generate a first distortion signal set including at least one distortion signal. The method 1100 continues in step 1130 by processing, by the wireless communication device, the first distortion signal set to generate a first RX correction signal. Also, the method 1100 operates in step 1140 generating, by the wireless communication device, a first distortion compensated RX signal by compensating for distortion in a first RX signal of the first TX-RX pair based on the first RX correction signal.

Within other variants of the method 1100, the processing the first TX signal and the second TX signal based on a first base function set also includes processing the first TX signal, a conjugate of the first TX signal, the second TX signal, and a conjugate of the second TX signal based on the first base function set to generate the first distortion signal set.

Other variants of the method 1100 also operate by processing the first TX signal and the second TX signal based on a frequency shift, a delay, and/or a low pass filter (LPF) to generate the first distortion signal set. Even other variants of the method 1100 operate by processing the first TX signal and the second TX signal based on an environmental operational parameter, a local operational parameter corresponding to the wireless communication device, and/or a remote operational parameter corresponding to a wireless device configured to communicate with the wireless communication device.

Some additional alternative variants of the method 1100 operate by generating a first TX DFE signal based on the first TX signal, generating a first analog TX signal according to the first TX DFE signal, generating a first digital RX signal based on a first analog RX signal, and also generating a first RX DFE signal based on the first digital RX signal.

Also, other variants of the method 1100 operate by processing the first TX signal and the second TX signal based on a second base function set including at least one base function to generate a second distortion signal set including at least one distortion signal. Such variants of the method 1100 also operate by processing the second distortion signal set to generate a second RX correction signal and generating a second distortion compensated RX signal by compensating for distortion in a second RX signal of the second TX-RX pair based on the second RX correction signal. Within the method 1100 and/or variants thereof, note that the first base function may include a first predetermined product term based on the first TX signal and the second TX signal, and the second base function may include a second predetermined product term based on the first TX signal and the second TX signal.

Optionally, note that a wireless communication device such as described herein and implemented to execute any of the various methods and/or variants in any of the various examples, embodiments, etc. described herein may be viewed as being a User Equipment (UE). Also, optionally, note that a wireless communication access node (WCAN) device that is operative to support communications with such a wireless communication device in any of the various examples, embodiments, etc. described herein may be implemented as any one or more of a base station, a distributed base station, an Evolved Node B (eNodeB), a Home Evolved Node B (Home eNodeB), and/or a 5G Evolved Node B (gNodeB).

This disclosure present, among other things, a communication device that includes one or more receiver (RX) distortion estimators that are configured to estimate transmitter (TX) signal distortion within the communication device. The communication device uses the one or more receiver (RX) distortion estimators to mitigate distortion that may negatively affect processing of one or more RX signals.

In a specific embodiment, such processing is performed to correct the RX signals that may be affected by distortion in an LTE inter-band CA receive path. The RX distortion estimator estimates the distortion based on the one or more TX signals (and/or the conjugate of the one or more TX signals) and corresponding harmonics. In some examples, the TX distortion center frequency is emulated by a complex frequency shift based TX operating frequencies and the affected RX operating frequency. Also, delay blocks may be added to synchronize the distortion signals and correction signals. In addition, complex low pass filter (LPF) blocks may also be included in the one or more RX distortion estimators to represent the gain, RF phase shift and possible frequency response. In addition, original, start-up, default, etc. values of such parameters, values, coefficients, etc. to be used in accordance with such RX distortion estimator processing may be determined based on a factory calibration phase, process, etc. Then, after operation of such a communication device that performs such the functionality, processing, means, etc. as described herein is operative within one or more communication systems, those such parameters, values, coefficients, etc. may be updated, adapted, modified, etc. based on any number of considerations such as environmental conditions, operational history, processing resource history, component drift, and/or any other one or more considerations.

In addition, the present disclosure presents, among other features, aspects, teaching and disclosure, improvements, etc. means to correct for any receiver distortion in the digital domain. Among other benefits, this can significantly reduce front-end component requirement(s), save cost and power consumption. In addition, in such instances where operation in accordance with linearity requirement(s) that may be high and when one or more front-end components of a device may have difficult complying with such linearity requirement(s), the present disclosure also presents, among other features, aspects, teaching and disclosure, improvements, etc. means to deliver superior RX sensitivity performance than other known techniques and can improve cell coverage and/or data throughput within such communication systems. In a specific example, this can improve cell coverage and/or data throughput within communication systems that operates based on Long Term Evolution (LTE) uplink (UL) inter-band carrier aggregation (CA) operation.

It is noted that the various operations and functions described within various methods herein may be performed within a communication device and/or wireless communication device (e.g., such as by a WCAN device, a UE, and/or other communication device and such operations may be performed by processing circuitry, a communication interface, and a memory as may be implemented in any of a variety of configurations) and/or other components therein. Generally, a communication interface and processing circuitry (or alternatively processing circuitry that includes communication interface functionality, components, circuitry, etc.) in a communication device and/or wireless communication device can perform such operations.

Examples of some components may include one or more baseband processing modules, one or more media access control (MAC) layer components, one or more physical layer (PHY) components, and/or other components, etc. For example, such processing circuitry can perform baseband processing operations and can operate in conjunction with a radio, analog front end (AFE), etc. The processing circuitry can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennas. In some embodiments, such processing is performed cooperatively by processing circuitry in a first device and another processing circuitry within a second device. In other embodiments, such processing is performed wholly by processing circuitry within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" or their equivalents may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, processing circuitry, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a plurality of transmitter (TX)-receiver (RX) pairs; and
a first RX distortion estimator corresponding to a first TX-RX pair is configured to:
receive a first TX signal corresponding to a first TX of the first TX-RX pair and a second TX signal corresponding to a second TX of a second TX-RX pair;
process the first TX signal and the second TX signal based on a first base function set including at least one base function to generate a first distortion signal set including at least one distortion signal;
process the first distortion signal set to generate a first RX correction signal;
a first combiner configured to generate a first distortion compensated RX signal by compensating for distortion in a first RX signal of the first TX-RX pair based on the first RX correction signal;
a second RX distortion estimator corresponding to the second TX-RX pair is configured to:
receive the first TX signal corresponding to the first TX of the first TX-RX pair and the second TX signal corresponding to the second TX of the second TX-RX pair;
process the first TX signal and the second TX signal based on a second base function set including at least one base function to generate a second distortion signal set including at least one distortion signal; and
process the second distortion signal set to generate a second RX correction signal; and
a second combiner configured to generate a second distortion compensated RX signal by compensating for distortion in a second RX signal of the second TX-RX pair based on the second RX correction signal.

2. The wireless communication device of claim 1, wherein the first RX distortion estimator is further configured to:
process the first TX signal, a conjugate of the first TX signal, the second TX signal, and a conjugate of the second TX signal based on the first base function set to generate the first distortion signal set.

3. The wireless communication device of claim 1, wherein the first RX distortion estimator is further configured to:
process the first TX signal and the second TX signal based on at least one of a frequency shift, a delay, or a low pass filter (LPF) to generate the first distortion signal set.

4. The wireless communication device of claim 1, wherein the first RX distortion estimator is further configured to
process the first TX signal and the second TX signal based on at least one of an environmental operational parameter, a local operational parameter corresponding to the wireless communication device, or a remote operational parameter corresponding to a wireless device configured to communicate with the wireless communication device.

5. The wireless communication device of claim 1, wherein the first RX distortion estimator is within a digital baseband circuitry that includes a first digital TX-RX processing path, and wherein the first digital TX-RX processing path includes:
a first digital front end (DFE) configured to process the first TX signal to generate a first TX DFE signal;
a first digital to analog converter (DAC) configured to process the first TX DFE signal to generate a first analog TX signal and to provide the first analog TX signal to the first TX of the first TX-RX pair;

a first analog to digital converter (ADC) circuitry configured to process a first analog RX signal received from the first RX of the first TX-RX pair to generate a first digital RX signal; and a second DFE configured to process the first digital RX signal to generate a first RX DFE signal.

6. The wireless communication device of claim 1, further comprising:

the first TX-RX pair configured to communicate via at least one wireless communication channel with at least one wireless communication access node (WCAN) device based on a first band pair of the wireless communication channel; and the second TX-RX pair configured to communicate via the at least one wireless communication channel with the at least one WCAN device based on a second band pair of the wireless communication channel.

7. The wireless communication device of claim 1, wherein:

the first base function includes a first predetermined product term based on the first TX signal and the second TX signal; and the second base function includes a second predetermined product term based on the first TX signal and the second TX signal.

8. A method for execution by a wireless communication device, the method comprising:

receiving, by the wireless communication device, a first TX signal corresponding to a first TX of a first transmitter (TX)-receiver (RX) pair and a second TX signal corresponding to a second TX of a second TX-RX pair;

processing, by the wireless communication device, the first TX signal and the second TX signal based on a first base function set including at least one base function to generate a first distortion signal set including at least one distortion signal;

processing, by the wireless communication device, the first distortion signal set to generate a first RX correction signal;

generating, by the wireless communication device, a first distortion compensated RX signal by compensating for distortion in a first RX signal of the first TX-RX pair based on the first RX correction signal;

processing the first TX signal and the second TX signal based on a second base function set including at least one base function to generate a second distortion signal set including at least one distortion signal;

processing the second distortion signal set to generate a second RX correction signal; and generating a second distortion compensated RX signal by compensating for distortion in a second RX signal of the second TX-RX pair based on the second RX correction signal.

9. The method of claim 8, wherein processing the first TX signal and the second TX signal based on a first base function set comprising:

processing the first TX signal, a conjugate of the first TX signal, the second TX signal, and a conjugate of the second TX signal based on the first base function set to generate the first distortion signal set.

10. The method of claim 8 further comprising:

processing the first TX signal and the second TX signal based on at least one of a frequency shift, a delay, or a low pass filter (LPF) to generate the first distortion signal set.

11. The method of claim 8 further comprising:

processing the first TX signal and the second TX signal based on at least one of an environmental operational parameter, a local operational parameter corresponding to the wireless communication device, or a remote operational parameter corresponding to a wireless device configured to communicate with the wireless communication device.

12. The method of claim 8 further comprising:

generating a first TX DFE signal based on the first TX signal;

generating a first analog TX signal according to the first TX DFE signal;

generating a first digital RX signal based on a first analog RX signal; and generating a first RX DFE signal based on the first digital RX signal.

13. The method of claim 8, wherein the first base function includes a first predetermined product term based on the first TX signal and the second TX signal, and the second base function includes a second predetermined product term based on the first TX signal and the second TX signal.

14. A wireless communication device comprising:

a plurality of transmitter (TX)-receiver (RX) pairs;

a non-transitory memory storage comprising instructions; and one or more processors in communication with the plurality of TX-RX pairs and to the memory, wherein the one or more processors is configured to execute the instructions to:

receive a first TX signal corresponding to a first TX of a first TX-RX pair and a second TX signal corresponding to a second TX of a second TX-RX pair;

process the first TX signal and the second TX signal based on a first base function set including at least one base function to generate a first distortion signal set including at least one distortion signal;

process the first distortion signal set to generate a first RX correction signal;

generate a first distortion compensated RX signal by compensating for distortion in a first RX signal of the first TX-RX pair based on the first RX correction signal;

wherein the one or more processors is further configured to execute the instructions to:

process the first TX signal and the second TX signal based on a second base function set including at least one base function to generate a second distortion signal set including at least one distortion signal;

process the second distortion signal set to generate a second RX correction signal; and generate a second distortion compensated RX signal by compensating for distortion in a second RX signal of the second TX-RX pair based on the second RX correction signal.

15. The wireless communication device of claim 14, wherein the instruction to process the first TX signal and the second TX signal based on a first base function set comprising:

process the first TX signal, a conjugate of the first TX signal, the second TX signal, and a conjugate of the second TX signal based on the first base function set to generate the first distortion signal set.

16. The wireless communication device of claim 14, wherein the one or more processors is further configured to execute the instructions to:

process the first TX signal and the second TX signal based on at least one of an environmental operational parameter, a local operational parameter corresponding to the wireless communication device, or a remote operational parameter corresponding to a wireless device configured to communicate with the wireless communication device.

17. The wireless communication device of claim 14, wherein the first base function includes a first predetermined product term based on the first TX signal and the second TX signal, and the second base function includes a second predetermined product term based on the first TX signal and the second TX signal.

* * * * *